United States Patent
Su et al.

(10) Patent No.: US 11,245,439 B2
(45) Date of Patent: Feb. 8, 2022

(54) INFORMATION INDICATING AND DETERMINING METHOD AND APPARATUS, AND COMPUTER STORAGE MEDIUM

(71) Applicant: China Academy of Telecommunications Technology, Beijing (CN)

(72) Inventors: Xin Su, Beijing (CN); Qiubin Gao, Beijing (CN); Tamrakar Rakesh, Beijing (CN); Runhua Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 16/960,876

(22) PCT Filed: Dec. 17, 2018

(86) PCT No.: PCT/CN2018/121591
§ 371 (c)(1),
(2) Date: Jul. 8, 2020

(87) PCT Pub. No.: WO2019/137162
PCT Pub. Date: Jul. 18, 2019

(65) Prior Publication Data
US 2021/0083724 A1    Mar. 18, 2021

(30) Foreign Application Priority Data
Jan. 12, 2018    (CN) .................. 201810032656.X

(51) Int. Cl.
*H04B 7/02* (2018.01)
*H04B 7/024* (2017.01)
(Continued)

(52) U.S. Cl.
CPC .......... *H04B 7/024* (2013.01); *H04L 5/0051* (2013.01); *H04L 27/2613* (2013.01)

(58) Field of Classification Search
CPC .... H04B 7/024; H04L 5/0051; H04L 27/2613
(Continued)

(56) References Cited

U.S. PATENT DOCUMENTS

2017/0078006 A1    3/2017  Liu et al.
2020/0221429 A1*   7/2020  Li .................... H04L 5/0053

FOREIGN PATENT DOCUMENTS

CN    103945447 A    7/2014
CN    104704786 A    6/2015
(Continued)

OTHER PUBLICATIONS

Catt, "Details of Discussion on Remaining Details of DMRS, R1-1715807" 3GPP RSG RAN GI Meeting NR#3, Sep. 21, 2017 (Sep. 21, 2017) (Year: 2017).*

(Continued)

*Primary Examiner* — Kevin M Burd
(74) *Attorney, Agent, or Firm* — Kilpatrick Townsend & Stockton, LLP

(57) ABSTRACT

The present application discloses an information indicating and determining method and apparatus, and a computer storage medium, being used for indicating QCL group information of a DMRS port, enabling a terminal to determine the QCL group information of the DMRS port. The embodiments of the present application provide an information indicating method, comprising: determining QCL group information of a demodulation reference signal DMRS port; and notifying a terminal of the QCL group information.

12 Claims, 6 Drawing Sheets

(51) Int. Cl.
    *H04L 5/00*     (2006.01)
    *H04L 27/26*     (2006.01)

(58) Field of Classification Search
    USPC .......................................................... 370/329
    See application file for complete search history.

(56) References Cited

FOREIGN PATENT DOCUMENTS

| | | |
|---|---|---|
| CN | 105900387 A | 8/2016 |
| CN | 107306177 A | 10/2017 |
| CN | 104604166 B | 11/2017 |
| CN | 107431522 A | 12/2017 |
| CN | 107534540 A | 1/2018 |
| WO | 2017135696 A1 | 8/2017 |

OTHER PUBLICATIONS

Huawei etal, "Remaining details of QCL assumptions, RI-1719443" 3GPP TSG RAN WGI Meeting #91, Dec. 1, 2017 (Dec. 1, 2017) (Year: 2017).*

Spreadtrum Communications,"Considerations on PT-RS for CP-OFDM", 3GPP TSG RAN WG1 Meeting #90, Prague, Czech Rep. Aug. 21-25, 2017, total 6 pages, R1-1713053.

Catt,"Discussion on remaining details of DMRS", 3GPP TSG RAN WG1 Meeting NR#3, Nagoya, Japan, Sep. 18-21, 2017, total 9 pages, R1-1715807.

Huawei et al."Details of QCL assumptions and related RS design considerations",3GPP TSG RAN WGI Meeting #90bis,Prague, Czech Republic, Oct. 9-13, 2017, total 6 pages, RI-1717309.

Huawei et al.,"Remaining details of QCL assumptions", 3GPP TSG RAN WG1 Meeting #91, Reno, USA, Nov. 27-Dec. 1, 2017, total 6 pages, R1-1719443.

Huawei et al.,"Details of QCL assumptions and related RS design considerations", 3GPP TSG RAN WG1 Meeting #88bis, Spokane, USA, Apr. 3-7, 2017, total 5 pages, R1-1704239.

Catt,"Discussion on multi-panel/multi-TRP transmission", 3GPP TSG RAN WG1 Meeting #88bis, Spokane, USA Apr. 3-7, 2017, total 5 pages. R1-1704549.

Catt,"Further discussion on multi-panel/multi-TRP transmission", 3GPP TSG RAN WG1 Meeting #88bis, Hangzhou, China May 15-19, 2017, total 2 pages, R1-1707474.

* cited by examiner

--Prior Art--

--Prior Art--

--Prior Art--

INFORMATION INDICATING AND DETERMINING METHOD AND APPARATUS, AND COMPUTER STORAGE MEDIUM

The present application is a National Stage of International Application No. PCT/CN2018/121591, filed on Dec. 17, 2018, which claims the priority from Chinese Patent Application No. 201810032656.X, filed with the Chinese Patent Office on Jan. 12, 2018 and entitled "Information Indicating and Determining Method and Apparatus, and Computer Storage Medium", both of which are hereby incorporated by reference in their entireties.

FIELD OF DISCLOSURE

The present application relates to the field of communication technologies, and particularly to an information indicating and determining method and apparatus, and a computer storage medium.

BACKGROUND

In the New Radio (NR) system, the data demodulation process requires the channel estimation based on the Demodulation Reference Signal (DMRS). In the prior art, the DMRS in the NR system will be transmitted in the same pre-coding way as the corresponding data layer.

However, there is no solution of indicating and determining the information about the DMRS port in the prior art.

BRIEF SUMMARY

The embodiments of the present application provide an information indicating and determining method and apparatus, and a computer storage medium, to indicate the QCL group information of the DMRS port, so that the terminal determines the QCL group information of the DMRS port.

At the network side, an information indicating method provided by an embodiment of the present application includes:
  determining QCL group information of a DMRS port;
  notifying a terminal of the QCL group information.

By determining the QCL group information of the DMRS port and notifying the terminal of the QCL group information, the indication of the QCL group information of the DMRS port is implemented, so that the terminal determines the QCL group information of the DMRS port.

In one embodiments, determining QCL group information of a DMRS port, includes: determining an available DMRS port range, or determining a range of an available DMRS Code Division Multiplexing (CDM) group; and determining QCL grouping information of an available DMRS port; wherein the DMRS CDM group is a CDM group of DMRS ports;
  notifying a terminal of the QCL group information, includes: configuring the terminal with the QCL grouping information of the DMRS port or notifying the terminal of the QCL grouping information of the DMRS port.

In one embodiments, determining an available DMRS port range, includes one of the following ways:
  way 1-a-1: determining the available DMRS port range as all DMRS ports supported under a configuration condition that satisfies a DMRS configuration type and the maximum number of DMRS symbols;
  way 1-a-2: determining the available DMRS port range as all DMRS ports supported under a configuration condition that satisfies a DMRS configuration type;
  way 1-a-3: determining the available DMRS port range as all DMRS ports supported under a configuration condition that satisfies a DMRS configuration type and the maximum number of DMRS symbols as well as the number of layers that can be supported by a base station and terminal;
  way 1-a-4: selecting one or more DMRS ports as the available DMRS port range from the available DMRS port range determined in any above way.

In one embodiments, if the way 1-a-1 is adopted, then:
  when the DMRS configuration type is a first type and the maximum number of DMRS symbols is 1, the available DMRS port range is {1000-1003};
  when the DMRS configuration type is the first type and the maximum number of DMRS symbols is 2, the available DMRS port range is {1000-1007};
  when the DMRS configuration type is a second type and the maximum number of DMRS symbols is 1, the available DMRS port range is {1000-1005};
  when the DMRS configuration type is the second type and the maximum number of DMRS symbols is 2, the available DMRS port range is {1000-1011}.

In one embodiments, if the way 1-a-2 is adopted, then:
  when the DMRS configuration type is a first type, the available DMRS port range is {1000-1007};
  when the DMRS configuration type is a second type, the available DMRS port range is {1000-1011}.

In one embodiments, determining a range of an available DMRS CDM group, includes one of the following ways:
  way 1-b-1: determining the range of the available DMRS CDM group as all DMRS CDM groups supported under a configuration condition that satisfies a DMRS configuration type;
  way 1-b-2: determining the range of the available DMRS CDM group as one or more of all DMRS CDM groups supported under a configuration condition that satisfies a DMRS configuration type.

In one embodiments, if the way 1-b-1 is adopted, then:
  when the DMRS configuration type is a first type, the range of the available DMRS CDM group is {0, 1};
  when the DMRS configuration type is a second type, the range of the available DMRS CDM group is {0, 1, 2}.

In one embodiments, if the way 1-b-2 is adopted, then:
  when the DMRS configuration type is a first type, the available DMRS CDM group is {0, 1} or {0} or {1};
  when the DMRS configuration type is a second type, the available DMRS CDM group is {0, 1, 2} or {0, 1} or {1, 2} or {0, 2} or {0} or {1} or {2}.

In one embodiments, determining QCL grouping information of an available DMRS port, includes:
  determining all possible grouping ways of DMRS QCL according to the following principles:
  performing QCL grouping by taking the determined available DMRS CDM group as a basic device;
  dividing any available DMRS port or any available DMRS CDM group into the QCL grouping of DMRS ports.

In one embodiments, determining QCL grouping information of an available DMRS port when performing the QCL grouping on the available DMRS port, includes:
  when the DMRS configuration type is a first type, if the available DMRS port range is {1000-1003}, then:

when there are two QCL groups:
dmrs-group1={1000, 1001}, dmrs-group2={1002, 1003}; or
dmrs-group2={1000, 1001}, dmrs-group1={1002, 1003};
when there is a QCL group:
dmrs-group1={1000, 1001, 1002, 1003}, dmrs-group2={ }; or
dmrs-group2={1000, 1001, 1002, 1003}, dmrs-group1={ };
and dmrs-group1 represents a first QCL group, dmrs-group2 represents a second QCL group, and { } represents an empty or inexistent set.

In one embodiments, determining QCL grouping information of an available DMRS port when performing the QCL grouping on the available DMRS port, includes:
when the DMRS configuration type is a first type, if the available DMRS port range is {1000-1007}, then:
when there are two QCL groups:
dmrs-group1={1000, 1001, 1004, 1005}, dmrs-group2={1002, 1003, 1006, 1007}; or
dmrs-group2={1000, 1001, 1004, 1005}, dmrs-group1={1002, 1003, 1006, 1007};
when there is a QCL group:
dmrs-group1={1000, 1001, 1002, 1003, 1004, 1005, 1006, 1007}, dmrs-group2={ }; or
dmrs-group2={1000, 1001, 1002, 1003, 1004, 1005, 1006, 1007}, dmrs-group1={ };
and dmrs-group1 represents a first QCL group, dmrs-group2 represents a second QCL group, and { } represents an empty or inexistent set.

In one embodiments, determining QCL grouping information of an available DMRS port when performing the QCL grouping on the available DMRS port, includes:
when the DMRS configuration type is a second type, if the available DMRS port range is {1000-1005}, then:
when there are two QCL groups:
dmrs-group1={1000, 1001}, dmrs-group2={1002, 1003, 1004, 1005}; or
dmrs-group2={1000, 1001}, dmrs-group1={1002, 1003, 1004, 1005}; or
dmrs-group1={1000, 1001, 1002, 1003}, dmrs-group2={1004, 1005}; or
dmrs-group2={1000, 1001, 1002, 1003}, dmrs-group1={1004, 1005}; or
dmrs-group1={1002, 1003}, dmrs-group2={1000, 1001, 1004, 1005}; or
dmrs-group2={1002, 1003}, dmrs-group1={1000, 1001, 1004, 1005};
when there is a QCL group:
dmrs-group1={1000, 1001, 1002, 1003, 1004, 1005}, dmrs-group2={ }; or
dmrs-group2={1000, 1001, 1002, 1003, 1004, 1005}, dmrs-group1={ };
and dmrs-group1 represents a first QCL group, dmrs-group2 represents a second QCL group, and { } represents an empty or inexistent set.

In one embodiments, determining QCL grouping information of an available DMRS port when performing the QCL grouping on the available DMRS port, includes:
when the DMRS configuration type is a second type, if the available DMRS port range is {1000-1011}, then:
when there are two QCL groups:
dmrs-group1={1000, 1001, 1006, 1007}, dmrs-group2={1002, 1003, 1008, 1009, 1004, 1005, 1010, 1011}; or
dmrs-group2={1000, 1001, 1006, 1007}, dmrs-group1={1002, 1003, 1008, 1009, 1004, 1005, 1010, 1011}; or
dmrs-group1={1000, 1001, 1006, 1007, 1002, 1003, 1008, 1009}, dmrs-group2={1004, 1005, 1010, 1011}; or
dmrs-group2={1000, 1001, 1006, 1007, 1002, 1003, 1008, 1009}, dmrs-group1={1004, 1005, 1010, 1011}; or
dmrs-group1={1002, 1003, 1008, 1009}, dmrs-group2={1000, 1001, 1006, 1007, 1004, 1005, 1010, 1011}; or
dmrs-group2={1002, 1003, 1008, 1009}, dmrs-group1={1000, 1001, 1006, 1007, 1004, 1005, 1010, 1011};
when there is a QCL group:
dmrs-group1={1000, 1001, 1002, 1003, 1004, 1005, 1006, 1007, 1008, 1009, 1010, 1011}, dmrs-group2={ }; or
dmrs-group2={1000, 1001, 1002, 1003, 1004, 1005, 1006, 1007, 1008, 1009, 1010, 1011}, dmrs-group1={ };
and dmrs-group1 represents a first QCL group, dmrs-group2 represents a second QCL group, and { } represents an empty or inexistent set.

In one embodiments, determining QCL grouping information of an available DMRS port when performing the QCL grouping on the available DMRS CDM group, includes:
when the DMRS configuration type is a first type, if the available DMRS CDM group is {0, 1}, then:
when there are two QCL groups:
dmrs-group1={DMRS CDM group 0}, dmrs-group2={DMRS CDM group 1}; or
dmrs-group2={DMRS CDM group 0}, dmrs-group1={DMRS CDM group 1};
when there is a QCL group:
dmrs-group1={DMRS CDM group 0, DMRS CDM group 1}, dmrs-group2={ }; or
dmrs-group2={DMRS CDM group 0, DMRS CDM group 1}, dmrs-group1={ };
and dmrs-group1 represents a first QCL group, dmrs-group2 represents a second QCL group, and { } represents an empty or inexistent set.

In one embodiments, determining QCL grouping information of an available DMRS port when performing the QCL grouping on the available DMRS CDM group, includes:
when the DMRS configuration type is a second type, if the available DMRS CDM group is {0, 1, 3}, then:
when there are two QCL groups:
dmrs-group1={DMRS CDM group 0}, dmrs-group2={DMRS CDM group 1, DMRS CDM group 2}; or
dmrs-group2={DMRS CDM group 0}, dmrs-group1={DMRS CDM group 1, DMRS CDM group 2}; or
dmrs-group1={DMRS CDM group 1}, dmrs-group2={DMRS CDM group 0, DMRS CDM group 2}; or
dmrs-group2={DMRS CDM group 1}, dmrs-group1={DMRS CDM group 0, DMRS CDM group 2}; or
dmrs-group1={DMRS CDM group 2}, dmrs-group2={DMRS CDM group 0, DMRS CDM group 1}; or dmrs-group2={DMRS CDM group 2}, dmrs-group1={DMRS CDM group 0, DMRS CDM group 1};

when there is a QCL group:
dmrs-group1={DMRS CDM group 0, DMRS CDM group 1, DMRS CDM group 2}, dmrs-group2={ }; or
dmrs-group2={DMRS CDM group 0, DMRS CDM group 1, DMRS CDM group 2}, dmrs-group1={ };

and dmrs-group1 represents a first QCL group, dmrs-group2 represents a second QCL group, and { } represents an empty or inexistent set.

In one embodiments, configuring the terminal with the QCL grouping information of the DMRS port or notifying the terminal of the QCL grouping information of the DMRS port, includes:

configuring or notifying DMRS ports contained in each QCL grouping of DMRS ports; and/or configuring or notifying a DMRS CDM group contained in each QCL grouping of DMRS ports.

Accordingly, at the terminal side, an information determining method provided by an embodiment of the present application includes:

receiving a notification sent by a network side;

determining Quasi-Co-Location (QCL) group information of a DMRS port by using the notification.

In one embodiments, the QCL group information of the DMRS port, includes:

DMRS ports contained in each QCL grouping of DMRS ports; and/or a DMRS CDM group contained in each QCL grouping of DMRS ports.

At the network side, an information indicating apparatus provided by an embodiment of the present application includes: a memory and a processor, and the memory is configured to store the program instructions, and the processor is configured to invoke the program instructions stored in the memory to:

determine QCL group information of a DMRS port;

notify a terminal of the QCL group information.

In one embodiments, when determining the QCL group information of the DMRS port, the processor is configured to invoke the program instructions stored in the memory to:

determine an available DMRS port range, or determine a range of an available DMRS CDM group; and determine QCL grouping information of an available DMRS port; and the DMRS CDM group is a CDM group of DMRS ports;

when notifying the terminal of the QCL group information, the processor is configured to:

configure the terminal with the QCL grouping information of the DMRS port or notify the terminal of the QCL grouping information of the DMRS port.

In one embodiments, the processor is configured to invoke the program instructions stored in the memory to:

determine the available DMRS port range in one of the following ways:

way 1-a-1: determining the available DMRS port range as all DMRS ports supported under a configuration condition that satisfies a DMRS configuration type and the maximum number of DMRS symbols;

way 1-a-2: determining the available DMRS port range as all DMRS ports supported under a configuration condition that satisfies a DMRS configuration type;

way 1-a-3: determining the available DMRS port range as all DMRS ports supported under a configuration condition that satisfies a DMRS configuration type and the maximum number of DMRS symbols as well as the number of layers that can be supported by a base station and terminal;

way 1-a-4: selecting one or more DMRS ports as the available DMRS port range from the available DMRS port range determined in any above way.

In one embodiments, if the way 1-a-1 is adopted, then:

when the DMRS configuration type is a first type and the maximum number of DMRS symbols is 1, the available DMRS port range is {1000-1003};

when the DMRS configuration type is the first type and the maximum number of DMRS symbols is 2, the available DMRS port range is {1000-1007};

when the DMRS configuration type is a second type and the maximum number of DMRS symbols is 1, the available DMRS port range is {1000-1005};

when the DMRS configuration type is the second type and the maximum number of DMRS symbols is 2, the available DMRS port range is {1000-1011}.

In one embodiments, if the way 1-a-2 is adopted, then:

when the DMRS configuration type is a first type, the available DMRS port range is {1000-1007};

when the DMRS configuration type is a second type, the available DMRS port range is {1000-1011}.

In one embodiments, the processor is configured to invoke the program instructions stored in the memory to:

determine the range of the available DMRS CDM group in one of the following ways:

way 1-b-1: determining the range of the available DMRS CDM group as all DMRS CDM groups supported under a configuration condition that satisfies a DMRS configuration type;

way 1-b-2: determining the range of the available DMRS CDM group as one or more of all DMRS CDM groups supported under a configuration condition that satisfies a DMRS configuration type.

In one embodiments, if the way 1-b-1 is adopted, then:

when the DMRS configuration type is a first type, the range of the available DMRS CDM group is {0, 1};

when the DMRS configuration type is a second type, the range of the available DMRS CDM group is {0, 1, 2}.

In one embodiments, if the way 1-b-2 is adopted, then:

when the DMRS configuration type is a first type, the available DMRS CDM group is {0, 1} or {0} or {1};

when the DMRS configuration type is a second type, available DMRS CDM group is {0, 1, 2} or {0, 1} or {1, 2} or {0, 2} or {0} or {1} or {2}.

In one embodiments, the processor is configured to invoke the program instructions stored in the memory to:

determine all possible grouping ways of DMRS QCL according to the following principles:

performing QCL grouping by taking the determined available DMRS CDM group as a basic device;

dividing any available DMRS port or any available DMRS CDM group into the QCL grouping of DMRS ports.

In one embodiments, the processor is configured to invoke the program instructions stored in the memory to determine:

when the DMRS configuration type is a first type, if the available DMRS port range is {1000-1003}, then:

when there are two QCL groups:
dmrs-group1={1000, 1001}, dmrs-group2={1002, 1003}; or
dmrs-group2={1000, 1001}, dmrs-group1={1002, 1003};

when there is a QCL group:

dmrs-group1={1000, 1001, 1002, 1003}, dmrs-group2={ }; or
dmrs-group2={1000, 1001, 1002, 1003}, dmrs-group1={ };
and dmrs-group1 represents a first QCL group, dmrs-group2 represents a second QCL group, and { } represents an empty or inexistent set.

In one embodiments, the processor is configured to invoke the program instructions stored in the memory to determine:
when the DMRS configuration type is a first type, if the available DMRS port range is {1000-1007}, then:
when there are two QCL groups:
dmrs-group1={1000, 1001, 1004, 1005}, dmrs-group2={1002, 1003, 1006, 1007}; or
dmrs-group2={1000, 1001, 1004, 1005}, dmrs-group1={1002, 1003, 1006, 1007};
when there is a QCL group:
dmrs-group1={1000, 1001, 1002, 1003, 1004, 1005, 1006, 1007}, dmrs-group2={ }; or
dmrs-group2={1000, 1001, 1002, 1003, 1004, 1005, 1006, 1007}, dmrs-group1={ };
and dmrs-group1 represents a first QCL group, dmrs-group2 represents a second QCL group, and { } represents an empty or inexistent set.

In one embodiments, the processor is configured to invoke the program instructions stored in the memory to determine:
when the DMRS configuration type is a second type, if the available DMRS port range is {1000-1005}, then:
when there are two QCL groups:
dmrs-group1={1000, 1001}, dmrs-group2={1002, 1003, 1004, 1005}; or
dmrs-group2={1000, 1001}, dmrs-group1={1002, 1003, 1004, 1005}; or
dmrs-group1={1000, 1001, 1002, 1003}, dmrs-group2={1004, 1005}; or
dmrs-group2={1000, 1001, 1002, 1003}, dmrs-group1={1004, 1005}; or
dmrs-group1={1002, 1003}, dmrs-group2={1000, 1001, 1004, 1005}; or
dmrs-group2={1002, 1003}, dmrs-group1={1000, 1001, 1004, 1005};
when there is a QCL group:
dmrs-group1={1000, 1001, 1002, 1003, 1004, 1005}, dmrs-group2={ }; or
dmrs-group2={1000, 1001, 1002, 1003, 1004, 1005}, dmrs-group1={ };
and dmrs-group1 represents a first QCL group, dmrs-group2 represents a second QCL group, and { } represents an empty or inexistent set.

In one embodiments, the processor is configured to invoke the program instructions stored in the memory to determine:
when the DMRS configuration type is a second type, if the available DMRS port range is {1000-1011}, then:
when there are two QCL groups:
dmrs-group1={1000, 1001, 1006, 1007}, dmrs-group2={1002, 1003, 1008, 1009, 1004, 1005, 1010, 1011}; or
dmrs-group2={1000, 1001, 1006, 1007}, dmrs-group1={1002, 1003, 1008, 1009, 1004, 1005, 1010, 1011}; or
dmrs-group1={1000, 1001, 1006, 1007, 1002, 1003, 1008, 1009}, dmrs-group2={1004, 1005, 1010, 1011}; or
dmrs-group2={1000, 1001, 1006, 1007, 1002, 1003, 1008, 1009}, dmrs-group1={1004, 1005, 1010, 1011}; or
dmrs-group1={1002, 1003, 1008, 1009}, dmrs-group2={1000, 1001, 1006, 1007, 1004, 1005, 1010, 1011}; or
dmrs-group2={1002, 1003, 1008, 1009}, dmrs-group1={1000, 1001, 1006, 1007, 1004, 1005, 1010, 1011};
when there is a QCL group:
dmrs-group1={1000, 1001, 1002, 1003, 1004, 1005, 1006, 1007, 1008, 1009, 1010, 1011}, dmrs-group2={ }; or
dmrs-group2={1000, 1001, 1002, 1003, 1004, 1005, 1006, 1007, 1008, 1009, 1010, 1011}, dmrs-group1={ };
and dmrs-group1 represents a first QCL group, dmrs-group2 represents a second QCL group, and { } represents an empty or inexistent set.

In one embodiments, the processor is configured to invoke the program instructions stored in the memory to determine QCL grouping information of an available DMRS port when performing the QCL grouping on the available DMRS CDM group, by determining:
when the DMRS configuration type is a first type, if the available DMRS CDM group is {0, 1}, then:
when there are two QCL groups:
dmrs-group1={DMRS CDM group 0}, dmrs-group2={DMRS CDM group 1}; or
dmrs-group2={DMRS CDM group 0}, dmrs-group1={DMRS CDM group 1};
when there is a QCL group:
dmrs-group1={DMRS CDM group 0, DMRS CDM group 1}, dmrs-group2={ }; or
dmrs-group2={DMRS CDM group 0, DMRS CDM group 1}, dmrs-group1={ };
and dmrs-group1 represents a first QCL group, dmrs-group2 represents a second QCL group, and { } represents an empty or inexistent set.

In one embodiments, the processor is configured to invoke the program instructions stored in the memory to determine:
when the DMRS configuration type is a second type, if the available DMRS CDM group is {0, 1, 3}, then:
when there are two QCL groups:
dmrs-group1={DMRS CDM group 0}, dmrs-group2={DMRS CDM group 1, DMRS CDM group 2}; or
dmrs-group2={DMRS CDM group 0}, dmrs-group1={DMRS CDM group 1, DMRS CDM group 2}; or
dmrs-group1={DMRS CDM group 1}, dmrs-group2={DMRS CDM group 0, DMRS CDM group 2}; or
dmrs-group2={DMRS CDM group 1}, dmrs-group1={DMRS CDM group 0, DMRS CDM group 2}; or
dmrs-group1={DMRS CDM group 2}, dmrs-group2={DMRS CDM group 0, DMRS CDM group 1}; or
dmrs-group2={DMRS CDM group 2}, dmrs-group1={DMRS CDM group 0, DMRS CDM group 1};
when there is a QCL group:
dmrs-group1={DMRS CDM group 0, DMRS CDM group 1, DMRS CDM group 2}, dmrs-group2={ }; or dmrs-group2={DMRS CDM group 0, DMRS CDM group 1, DMRS CDM group 2}, dmrs-group1={ };

and dmrs-group1 represents a first QCL group, dmrs-group2 represents a second QCL group, and { } represents an empty or inexistent set.

In one embodiments, the processor is configured to invoke the program instructions stored in the memory to determine:
configure or notify DMRS ports contained in each QCL grouping of DMRS ports; and/or
configure or notify a DMRS CDM group contained in each QCL grouping of DMRS ports.

Accordingly, at the terminal side, an information determining apparatus provided by an embodiment of the present application includes: a memory and a processor, and the memory is configured to store the program instructions, and the processor is configured to invoke the program instructions stored in the memory and, in accordance with the obtained program, perform:
receive a notification sent by a network side;
determine QCL group information of a DMRS port by using the notification.

In one embodiments, the QCL group information of the DMRS port, includes:
DMRS ports contained in each QCL grouping of DMRS ports; and/or a DMRS CDM group contained in each QCL grouping of DMRS ports.

Another information indicating apparatus provided by an embodiment of the present application includes:
a determining device configured to determine QCL group information of a DMRS port;
an indicating device configured to notify a terminal of the QCL group information.

Another information determining apparatus provided by an embodiment of the present application includes:
a receiving device configured to receive a notification sent by a network side;
a determining device configured to determine QCL group information of a DMRS port by using the notification.

Another embodiment of the present application provides a computer storage medium storing the computer executable instructions which are configured to cause the computer to perform any one of the above-mentioned methods.

BRIEF DESCRIPTION OF THE DRAWINGS

The embodiments of the present application are illustrated more clearly, the accompanying figures which need to be used in describing the embodiments will be introduced below briefly.

DETAILED DESCRIPTION OF THE EMBODIMENTS

The embodiments of the present application provide an information indicating and determining method and apparatus, and a computer storage medium, to indicate the QCL group information of the DMRS port, so that the terminal determines the QCL group information of the DMRS port.

The DMRS basic pattern (front-load DMRS) configuration includes the following cases.

Configuration 1

The number of DMRS symbols is 1: using combination (comb) 2+Cyclic Shift (CS) 2, which supports up to 4 ports.

Figure 1:
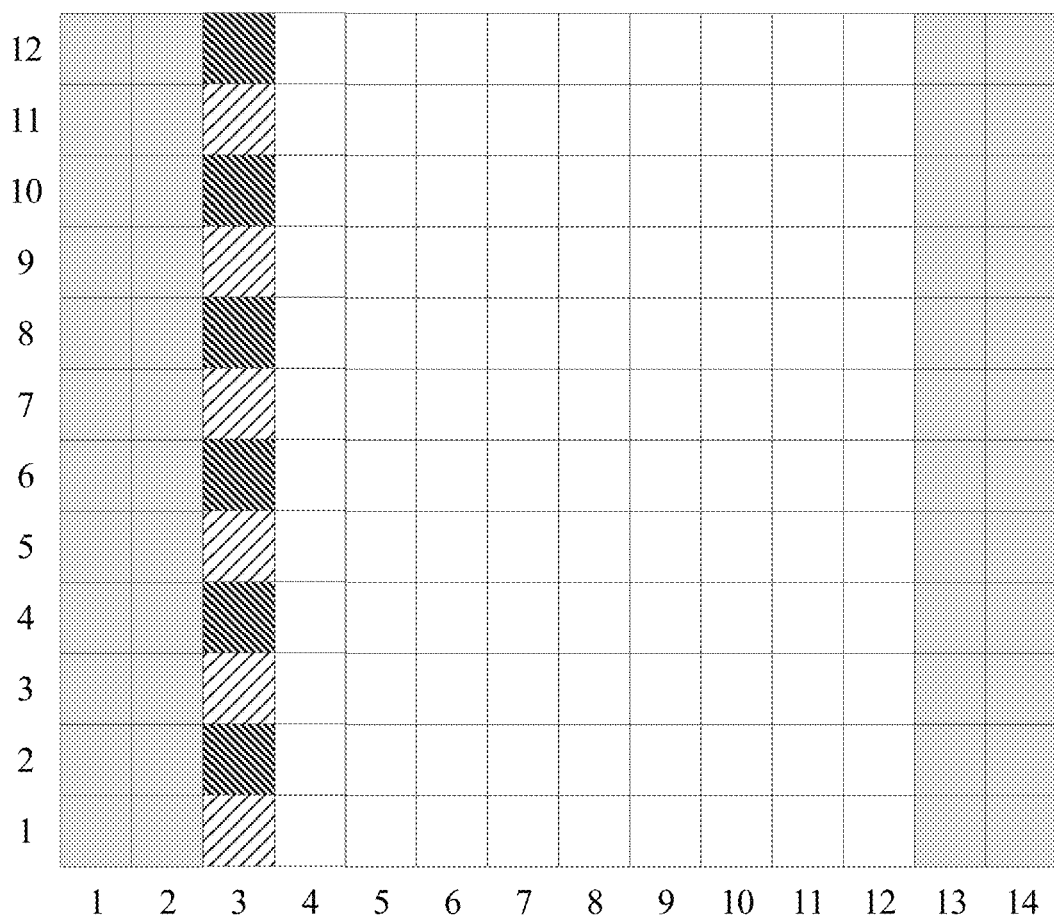
FIG. 1 is a pattern schematic diagram of a first DMRS provided by an embodiment of the present application.

Referring to FIG. 1, comb2 is frequency domain multiplexing, for example, the multiplexing relationship of comb2 exists between ports 0 and 2. CS2 is the multiplexing of the sequence between ports by way of Cyclic Shifting (CS), for example, the multiplexing relationship of CS2 exists between ports 0 and 1.

The number of DMRS symbols is 2: using comb2+CS2+TD-OCC ($\{1, 1\}$ and $\{1, -1\}$), which supports up to 8 ports, and TD-OCC ($\{1, 1\}$ and $\{1, -1\}$) means that the Time Domain Orthogonal Cover Code (TD-OCC) multiplexing is used between two ports, and $\{1, 1\}$ and $\{1, -1\}$ are the multiplexing coefficients of the two ports respectively.

Figure 2:
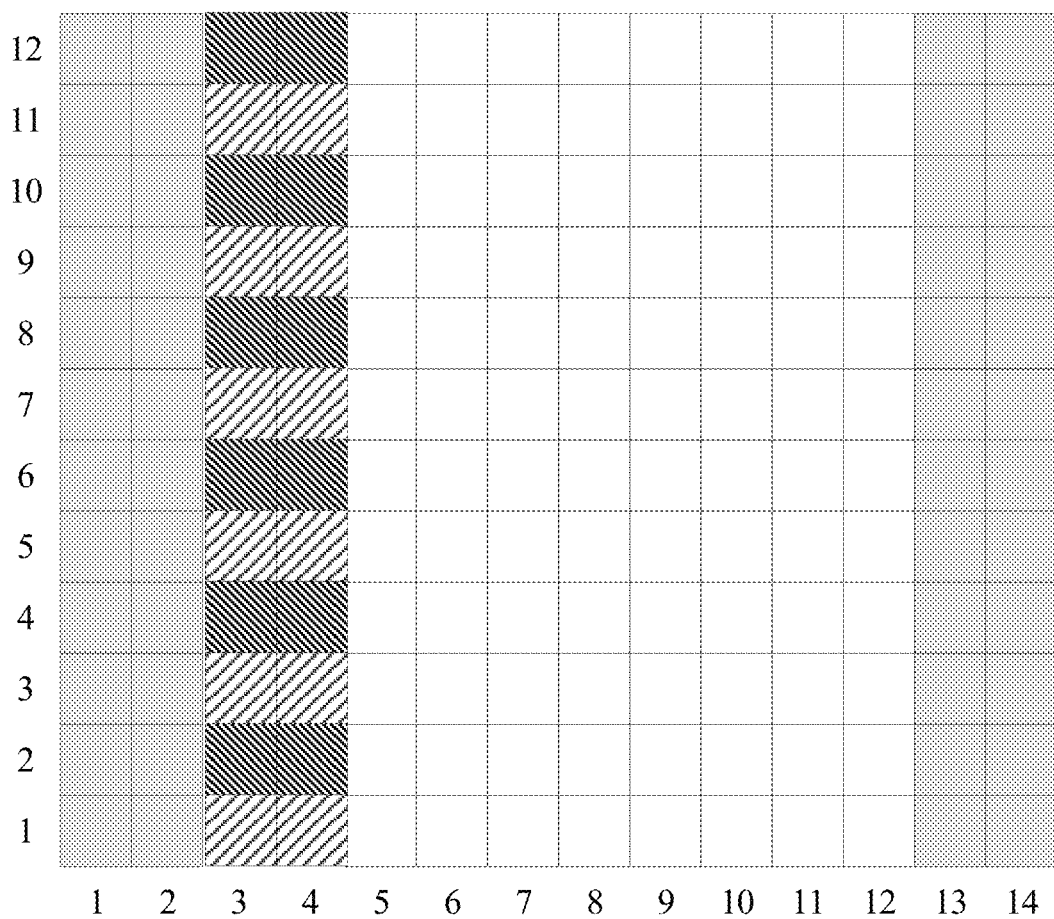
FIG. 2 is a pattern schematic diagram of a second DMRS provided by an embodiment of the present application.

Referring to FIG. 2, TD-OCC is time domain Orthogonal Cover Code (OCC) multiplexing, for example, the time domain OCC multiplexing is used between ports 0/1 and 4/5, and the CS0 multiplexing exists between port 0 and port 1, the CS2 multiplexing exists between port 4 and port 5, and the time domain OCC multiplexing exists between port 0/1 and port 4/5.

Configuration 2

The number of DMRS symbols is 1: using 2-FD-OCC (adjacent frequency domain Resource Element (RE)), which supports up to 6 ports.

Figure 3:
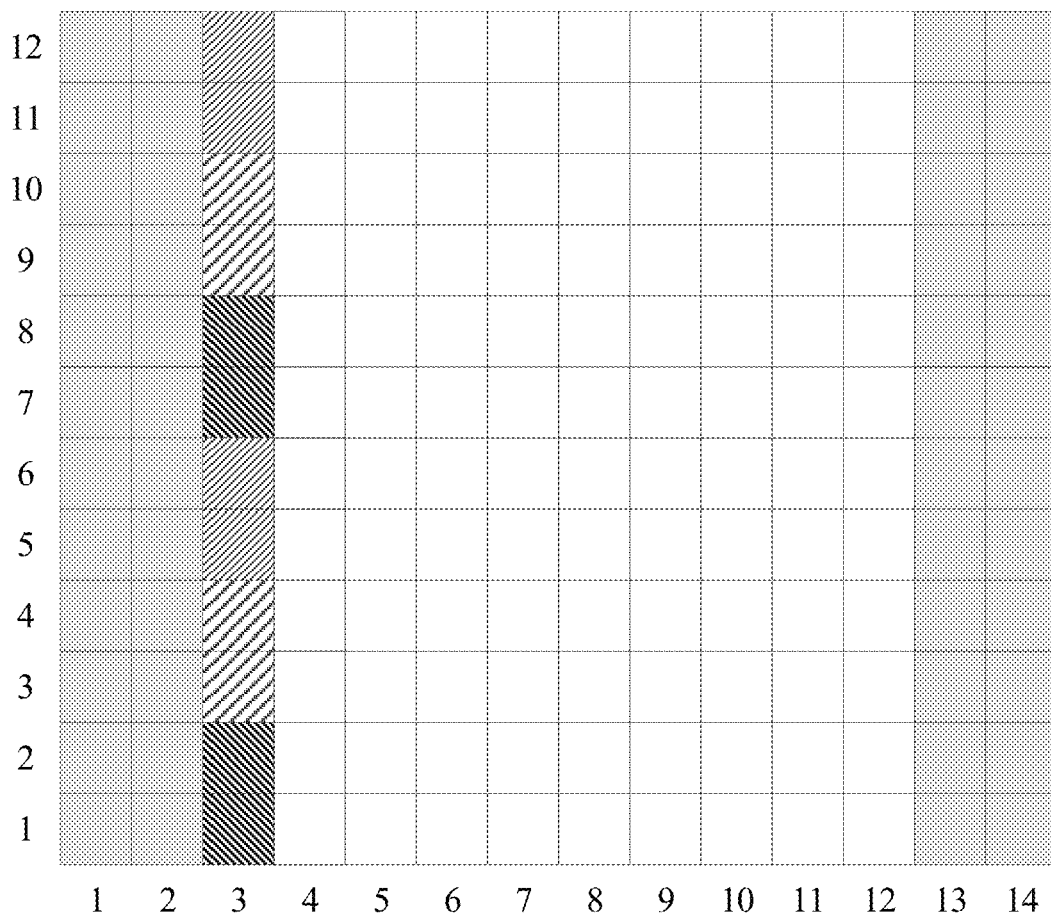
FIG. 3 is a pattern schematic diagram of a third DMRS provided by an embodiment of the present application.

Referring to FIG. 3, 2-FD-OCC is frequency domain OCC multiplexing, for example, the frequency domain OCC multiplexing exists between ports 0 and 1. In addition, the Frequency-Division Multiplexing (FDM) mode is used between other ports, for example, the FDM mode is used between ports 0/1 and 2/3.

The number of DMRS symbols is 2: using 2-FD-OCC (adjacent frequency domain RE)+TD-OCC ($\{1, 1\}$ and $\{1, -1\}$), which supports up to 12 ports.

Figure 4:
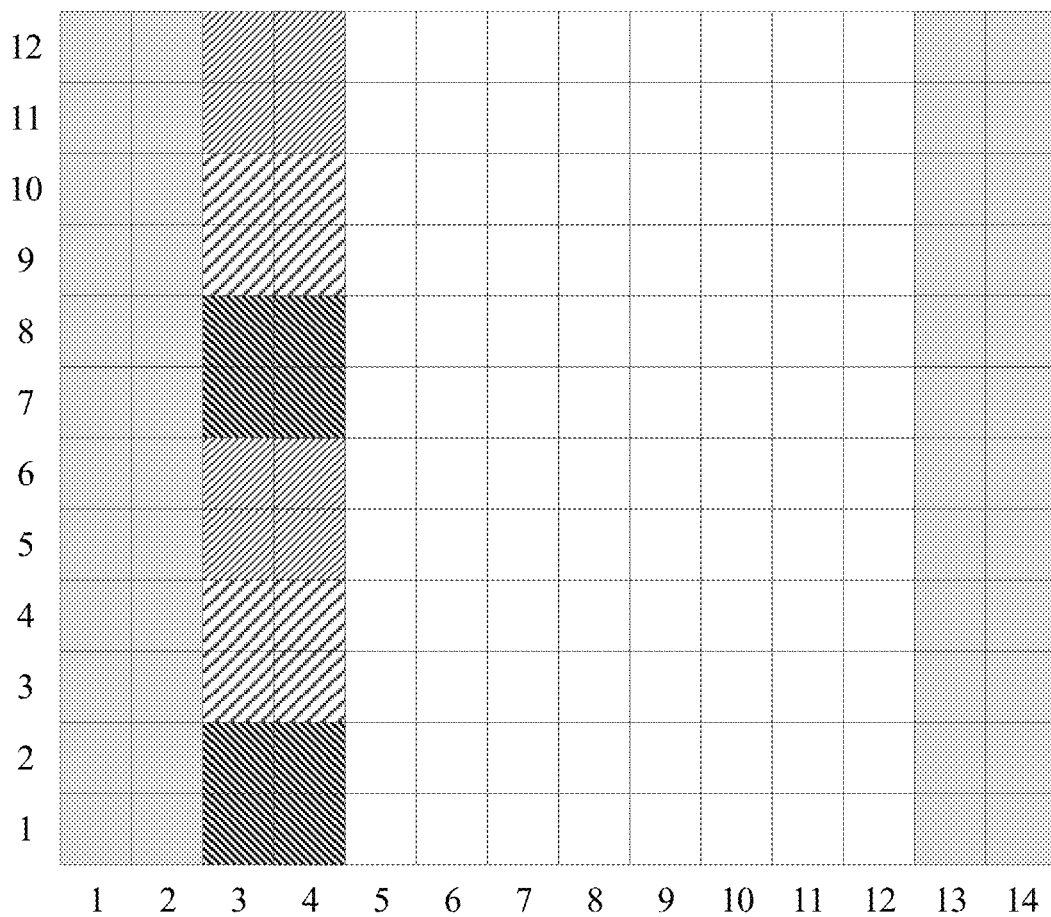
FIG. 4 is a pattern schematic diagram of a fourth DMRS provided by an embodiment of the present application.

Referring to FIG. 4, TD-OCC is time domain OCC multiplexing, for example, the time domain OCC multiplexing is used between ports 0/1 and 6/7.

As can be seen from various DMRS pilot patterns described above, in the case of configuration 1, if the maximum number of ports supported does not exceed 4, the pattern of FIG. 1 may be used for configuration, and if it exceeds 4 but does not exceed 8, the pattern of FIG. 2 may be used for configuration; and in the case of configuration 2, if the maximum number of ports supported does not exceed 6, the pattern of FIG. 3 may be used for configuration, and if it exceeds 6 but does not exceed 12, the pattern of FIG. 4 may be used for configuration. The number of ports mentioned here refers to the sum of the numbers of ports of all the terminals multiplexed at each resource location.

As a supplementary note, in FIGS. 1 to 4, the first two columns represent the control symbol field, i.e., the symbol positions that the downlink control channel needs to occupy, and the last two columns may be the symbol positions that the uplink control channel needs to occupy, i.e., the symbol resources that cannot be used for the PDSCH data channel.

In an NR system, there may be a need to consider a case of cooperative transmission of multiple Transmission/Reception Points (TRPs)/antenna panels or subarrays. In this case, the signals sent by different TRPs/panels may have relatively independent large-scale features, such as average delay, delay spread, average Doppler shift, Doppler spread, spatial domain reception parameters, etc. Therefore, in the NR, the case where two or more reference signal channels have the same large-scale parameters is called Quasi-Co-Location (QCL). Otherwise, it is called non-QCL, and the large-scale parameters are, for example, average delay, delay spread, Doppler shift, Doppler spread, spatial reception parameters, average reception power, etc. Furthermore, the QCL is further explained as follows: the terminal cannot judge that the received reference signal ports come from sites or antenna subarrays in the same or different physical positions; if two reference signal ports have the same average delay, delay spread, Doppler shift, Doppler spread, spatial reception parameters, average reception power and other parameters (or a subset thereof), it can be considered that these two reference signals are quasi-co-located in the sense of the above-mentioned large-scale parameters.

For the DMRS ports, the NR system defines the concept of QCL group, i.e., QCL group of DMRS ports (hereinafter may be called QCL group or QCL grouping for short): the DMRS ports in the QCL group are QCL, while the DMRS ports belonging to different QCL groups are non-QCL. It is specified in the NR system that the DMRS ports in the same Code Division Multiplexing (CDM) group have the QCL relationship. That is, in a CDM group, all the reference signal ports occupy the same time-frequency resources and are distinguished by orthogonal code words. Taking FIG. 4 as an example, due to the characteristics of the DMRS design, when there is a DMRS symbol, the port 0/1 has the CDM relationship, the port 2/3 has the CDM relationship, and there is the FDM relationship between the port 0/1 and port 2/3. In FIGS. 1 to 4, adjacent blocks with the same filling pattern form a CDM group. Each data channel can support two QCL groups. The data channel is, for example, a Physical Downlink Shared Channel (PDSCH).

The QCL group of DMRS ports described in the embodiments of the present application may be called QCL group for short, or may be called DMRS group.

The DMRS port described in the embodiments of the present application may be called port for short, or may be called antenna port.

The specific solution provided by an embodiment of the present application includes following.

Step 1: determining the available DMRS port range (denoted by the number of the DMRS port) or the range of the available DMRS CDM group (denoted by the number of the DMRS CDM group).

Here, the DMRS CDM group is a CDM group of DMRS ports, which may also be called CDM group for short hereafter, and the DMRS ports in the same CDM group have the QCL relationship.

With regard to determining the available DMRS port range, for example, one of the following ways may be adopted.

Way 1-a-1: determining the available DMRS port range as all DMRS ports supported under the configuration condition that satisfies the DMRS configuration type and the maximum number of DMRS symbols.

The DMRS configuration type and the maximum number of DMRS symbols described in the embodiments of the present application are the configuration parameters of the DMRS.

The DMRS configuration type described in the embodiments of the present application may be, for example, the downlink DMRS configuration type (DL-DMRS-config-type). When the DMRS configuration type is the first type, for example, DL-DMRS-config-type=1; and when the DMRS configuration type is the second type, for example, DL-DMRS-config-type=2.

The maximum number of DMRS symbols described in the embodiments of the present application may be, for example, the maximum number of downlink DMRS symbols (DL-DMRS-max-len). When the maximum number of DMRS symbols is 1, for example, DL-DMRS-max-len=1; and when the maximum number of DMRS symbols is 2, for example, DL-DMRS-max-len=2.

For example, according to the DL-DMRS-config-type and DL-DMRS-max-len, it is assumed that the available DMRS port range is all DMRS ports supported under the configuration condition of the DL-DMRS-config-type and DL-DMRS-max-len. For example:
when DL-DMRS-config-type=1 and DL-DMRS-max-len=1, the available DMRS port range is {1000-1003};
when DL-DMRS-config-type=1 and DL-DMRS-max-len=2, the available DMRS port range is {1000-1007};
when DL-DMRS-config-type=2 and DL-DMRS-max-len=1, the available DMRS port range is {1000-1005};
when DL-DMRS-config-type=2 and DL-DMRS-max-len=2, the available DMRS port range is {1000-10011}.

Way 1-a-2: determining the available DMRS port range as all DMRS ports supported under the configuration condition that satisfies the DMRS configuration type.

For example, according to the DL-DMRS-config-type, it is assumed that the available DMRS port range is all DMRS ports supported under the configuration condition of the DL-DMRS-config-type. For example:
when DL-DMRS-config-type=1, the available DMRS port range is {1000-1007};
when DL-DMRS-config-type=2, the available DMRS port range is {1000-1011}.

Way 1-a-3: determining the available DMRS port range as all DMRS ports supported under the configuration condition that satisfies the DMRS configuration type and the maximum number of DMRS symbols as well as the number of layers that can be supported by the base station and terminal.

For example, according to the DL-DMRS-config-type and DL-DMRS-max-len as well as the number of layers that can be supported by the base station and terminal, it is assumed that the available DMRS port range is all DMRS ports supported under the configuration condition of the DL-DMRS-config-type and DL-DMRS-max-len as well as the number of layers that can be supported by the base station and terminal.

Here, the number of layers is the number of data streams.

Way 1-a-4: selecting one or more DMRS ports as the available DMRS port range from the available DMRS port range determined in any above way.

That is, a subset in the DMRS port range determined in any above way is designated as the available DMRS port range, where the subset includes one or more DMRS ports.

With regard to determining the range of the available DMRS CDM group, one of the following ways may be adopted.

Way 1-b-1: determining the range of the available DMRS CDM group as all DMRS CDM groups supported under the configuration condition that satisfies the DMRS configuration type.

For example, according to the DL-DMRS-config-type, it is assumed that the range of the available DMRS CDM group is all DMRS CDM groups supported under the configuration condition of the DL-DMRS-config-type. Specifically, for example:

when DL-DMRS-config-type=1, the available DMRS CDM group is {0, 1};
when DL-DMRS-config-type=2, the available DMRS CDM group is {0, 1, 2}.

Way 1-b-2: determining the range of the available DMRS CDM group as one or more of all DMRS CDM groups supported under the configuration condition that satisfies the DMRS configuration type.

For example, the network side may designate a subset in all the DMRS CDM groups supported under the configuration condition of the DL-DMRS-config-type as the range of the available DMRS CDM group according to the DL-DMRS-config-type. For example:

when DL-DMRS-config-type=1, the available DMRS CDM group is {0, 1} or {0} or {1}, and the available DMRS CDM group is designated by the network side;
when DL-DMRS-config-type=2, the available DMRS CDM group is {0, 1, 2} or {0, 1} or {1, 2} or {0, 2} or {0} or {1} or {2}, and the available DMRS CDM group is designated by the network side.

Step 2: determining the available DMRS QCL grouping way according to the execution result of the above step 1. For example, all possible grouping ways of DMRS QCL are determined according to the following principles:

principle a: the QCL grouping is performed by taking a DMRS CDM group as the basic device, that is, the DMRS ports contained in each DMRS CDM group can only be divided into the same QCL group;
principle b: any available DMRS port or any available DMRS CDM group must be divided into the QCL grouping.

For example, when the QCL grouping is performed on available DMRS ports (denoted by port numbers):

when DL-DMRS-config-type=1, if the available DMRS port range (denoted by port numbers) is {1000-1003}, the optional DMRS QCL grouping ways include:
Case 1: when there are two QCL groups:
dmrs-group1={1000, 1001}, dmrs-group2={1002, 1003};
or, dmrs-group2={1000, 1001}, dmrs-group1={1002, 1003}.

In some embodiments of the present application, dmrs-group1 represents a first QCL group, dmrs-group2 represents a second QCL group, and { } represents an empty or inexistent set.

Case 2: when there is a QCL group:
One representation is:
dmrs-group1={1000, 1001, 1002, 1003}, dmrs-group2={ } (the set is empty or does not exist); or
dmrs-group2={1000, 1001, 1002, 1003}, dmrs-group1={ } (the set is empty or does not exist).
Another representation is:
the possible value of dmrs-group1 is: {1000, 1001}, {1002, 1003}, {1000, 1001, 1002, 1003}, { } (the set is empty or does not exist);
the possible value of dmrs-group2 is: {1000, 1001}, {1002, 1003}, {1000, 1001, 1002, 1003}, { } (the set is empty or does not exist);
there can be no intersection set between the values of dmrs-group1 and dmrs-group2, and the collection of dmrs-group1 and dmrs-group2 is {1000, 1001, 1002, 1003}.

When DL-DMRS-config-type=1, if the available DMRS port range is {1000-1007}, the optional DMRS QCL grouping ways include:
Case 1: when there are two QCL groups:
One representation is:
dmrs-group1={1000, 1001, 1004, 1005}, dmrs-group2={1002, 1003, 1006, 1007};
or
dmrs-group2={1000, 1001, 1004, 1005}, dmrs-group1={1002, 1003, 1006, 1007}.
Case 2: when there is a QCL group:
dmrs-group1={1000, 1001, 1002, 1003, 1004, 1005, 1006, 1007}, dmrs-group2={ } (the set is empty or does not exist);
or dmrs-group2={1000, 1001, 1002, 1003, 1004, 1005, 1006, 1007}, dmrs-group1={ } (the set is empty or does not exist).
Another representation is:
the possible value of dmrs-group1 is: {1000, 1001, 1004, 1005}, {1002, 1003, 1006, 1007}, {1000, 1001, 1002, 1003, 1004, 1005, 1006, 1007}, { } (the set is empty or does not exist);
the possible value of dmrs-group2 is: {1000, 1001, 1004, 1005}, {1002, 1003, 1006, 1007}, {1000, 1001, 1002, 1003, 1004, 1005, 1006, 1007}, { } (the set is empty or does not exist);
there can be no intersection set between the values of dmrs-group1 and dmrs-group2, and the collection of dmrs-group1 and dmrs-group2 is {1000, 1001, 1002, 1003, 1004, 1005, 1006, 1007}.

When DL-DMRS-config-type=2, if the available DMRS port range is {1000-1005}, the optional DMRS QCL grouping ways include:
One representation is:
When there are two QCL groups:
dmrs-group1={1000, 1001}, dmrs-group2={1002, 1003, 1004, 1005};
or dmrs-group2={1000, 1001}, dmrs-group1={1002, 1003, 1004, 1005};
or dmrs-group1={1000, 1001, 1002, 1003}, dmrs-group2={1004, 1005};
or dmrs-group2={1000, 1001, 1002, 1003}, dmrs-group1={1004, 1005};
or dmrs-group1={1002, 1003}, dmrs-group2={1000, 1001, 1004, 1005};
or dmrs-group2={1002, 1003}, dmrs-group1={1000, 1001, 1004, 1005}.
When there is a QCL group:
dmrs-group1={1000, 1001, 1002, 1003, 1004, 1005}, dmrs-group2={ } (the set is empty or does not exist);
or dmrs-group2={1000, 1001, 1002, 1003, 1004, 1005}, dmrs-group1={ } (the set is empty or does not exist).

Another representation is:
the possible value of dmrs-group1 is: {1000, 1001}, {1002, 1003}, {1004, 1005}, {1000, 1001, 1002, 1003}, {1000, 1001, 1004, 1005}, {1002, 1003, 1004, 1005}, {1000, 1001, 1002, 1003, 1004, 1005}, { } (the set is empty or does not exist);
the possible value of dmrs-group2 is: {1000, 1001}, {1002, 1003}, {1004, 1005}, {1000, 1001, 1002, 1003}, {1000, 1001, 1004, 1005}, {1002, 1003, 1004, 1005}, {1000, 1001, 1002, 1003, 1004, 1005}, { } (the set is empty or does not exist);
there can be no intersection set between the values of dmrs-group1 and dmrs-group2, and the collection of dmrs-group1 and dmrs-group2 is {1000, 1001, 1002, 1003, 1004, 1005}.

When DL-DMRS-config-type=2, if the available DMRS port range is {1000-1011}, the optional DMRS QCL grouping ways include:
One representation is:
When there are two QCL groups:
dmrs-group1={1000, 1001, 1006, 1007},
dmrs-group2={1002, 1003, 1008, 1009, 1004, 1005, 1010, 1011};
or
dmrs-group2={1000, 1001, 1006, 1007},
dmrs-group1={1002, 1003, 1008, 1009, 1004, 1005, 1010, 1011};
or
dmrs-group1={1000, 1001, 1006, 1007, 1002, 1003, 1008, 1009},
dmrs-group2={1004, 1005, 1010, 1011};
or
dmrs-group2={1000, 1001, 1006, 1007, 1002, 1003, 1008, 1009},
dmrs-group1={1004, 1005, 1010, 1011};
or
dmrs-group1={1002, 1003, 1008, 1009},
dmrs-group2={1000, 1001, 1006, 1007, 1004, 1005, 1010, 1011};
or
dmrs-group2={1002, 1003, 1008, 1009},
dmrs-group1={1000, 1001, 1006, 1007, 1004, 1005, 1010, 1011}.
When there is a QCL group:
dmrs-group1={1000, 1001, 1002, 1003, 1004, 1005, 1006, 1007, 1008, 1009, 1010, 1011};
dmrs-group2={ } (the set is empty or does not exist);
or
dmrs-group2={1000, 1001, 1002, 1003, 1004, 1005, 1006, 1007, 1008, 1009, 1010, 1011};
dmrs-group1={ } (the set is empty or does not exist).
Another representation is:
The possible value of dmrs-group1 is:
{1000, 1001, 1006, 1007},
{1002, 1003, 1008, 1009}, {1004, 1005, 1010, 1011},
{1000, 1001, 1006, 1007, 1002, 1003, 1008, 1009},
{1000, 1001, 1006, 1007, 1004, 1005, 1010, 1011},
{1002, 1003, 1008, 1009, 1004, 1005, 1010, 1011},
{1000, 1001, 1002, 1003, 1004, 1005, 1006, 1007, 1008, 1009, 1010, 1011},
{ } (the set is empty or does not exist);
The possible value of dmrs-group2 is:
{1000, 1001, 1006, 1007},
{1002, 1003, 1008, 1009}, {1004, 1005, 1010, 1011},
{1000, 1001, 1006, 1007, 1002, 1003, 1008, 1009},
{1000, 1001, 1006, 1007, 1004, 1005, 1010, 1011},
{1002, 1003, 1008, 1009, 1004, 1005, 1010, 1011},
{1000, 1001, 1002, 1003, 1004, 1005, 1006, 1007, 1008, 1009, 1010, 1011},
{ } (the set is empty or does not exist);
There can be no intersection set between the values of dmrs-group1 and dmrs-group2, and the collection of dmrs-group1 and dmrs-group2 is {1000, 1001, 1002, 1003, 1004, 1005, 1006, 1007, 1008, 1009, 1010, 1011}.

The illustration of an example where the QCL grouping is performed on the available DMRS CDM group (denoted by the CDM group number) will be given below.

When DL-DMRS-config-type=1, if the available DMRS CDM group is {0, 1};
One representation is:
When there are two QCL groups:
dmrs-group1={DMRS CDM group 0 (hereinafter called CDM group 0 for short)}, dmrs-group2={CDM group 1};
or dmrs-group2={CDM group 0}, dmrs-group1={CDM group 1}.
When there is a QCL group:
dmrs-group1={CDM group 0, CDM group 1}, dmrs-group2={ } (the set is empty or does not exist);
or dmrs-group2={CDM group 0, CDM group 1}, dmrs-group1={ } (the set is empty or does not exist).
Another representation is:
the possible value of dmrs-group1 is: {CDM group 0}, {CDM group 1}, {CDM group 0, CDM group 1}, { } (the set is empty or does not exist);
the possible value of dmrs-group2 is: {CDM group 0}, {CDM group 1}, {CDM group 0, CDM group 1}, { } (the set is empty or does not exist);
there can be no intersection set between the values of dmrs-group1 and dmrs-group2, and the collection of dmrs-group1 and dmrs-group2 is {CDM group 0, CDM group 1}.

When DL-DMRS-config-type=2, if the available DMRS CDM group is {0, 1, 3}:
One representation is:
When there are two QCL groups:
dmrs-group1={CDM group 0}, dmrs-group2={CDM group 1, CDM group 2}; or
dmrs-group2={CDM group 0}, dmrs-group1={CDM group 1, CDM group 2}; or
dmrs-group1={CDM group 1}, dmrs-group2={CDM group 0, CDM group 2}; or
dmrs-group2={CDM group 1}, dmrs-group1={CDM group 0, CDM group 2}; or
dmrs-group1={CDM group 2}, dmrs-group2={CDM group 0, CDM group 1}; or
dmrs-group2={CDM group 2}, dmrs-group1={CDM group 0, CDM group 1}.
When there is a QCL group:
dmrs-group1={CDM group 0, CDM group 1, CDM group 2}, dmrs-group2={ } (the set is empty or does not exist);
or dmrs-group2={CDM group 0, CDM group 1, CDM group 2}, dmrs-group1={ } (the set is empty or does not exist).
Another representation is:
the possible value of dmrs-group1 is: {CDM Group 0}, {CDM Group 1}, {CDM Group 2}, {CDM Group 0, CDM Group 1}, {CDM Group 1, CDM Group 2}, {CDM Group 0, CDM group 2}, {CDM group 0, CDM group 1, CDM group 2}, { } (the set is empty or does not exist);
the possible value of dmrs-group2 is: {CDM Group 0}, {CDM Group 1}, {CDM Group 2}, {CDM Group 0, CDM Group 1}, {CDM Group 1, CDM Group 2}, {CDM Group 0, CDM group 2}, {CDM group 0, CDM group 1, CDM group 2}, { } (the set is empty or does not exist);

there can be no intersection set between the values of dmrs-group1 and dmrs-group2, and the collection of dmrs-group1 and dmrs-group2 is {CDM group 0, CDM group 1, CDM group 2}.

Step 3: configuring or notifying the terminal with/of the DMRS QCL grouping way.

For example, according to the possible values of dmrs-group1 and dmrs-group2 determined in the step 2, the terminal is configured with or notified of a combination of the values of dmrs-group1 and dmrs-group2. For example, the configuration or notification may be performed in two following ways.

Way 3-a: notifying the DMRS ports contained in each QCL group (dmrs-group1 or 2) in the form of:
dmrs-group1={DMRS port set in dmrs-group1},
dmrs-group2={DMRS port set in dmrs-group2}.

If there is only one QCL group, the terminal can only be notified of the value of the non-empty DMRS QCL group, and the specific form is:
dmrs-group1={DMRS port set in dmrs-group1} (if dmrs-group1 is not empty);
or dmrs-group2={DMRS port set in dmrs-group2} (if dmrs-group2 is not empty).

Way 3-b: notifying the DMRS CDM groups contained in each QCL group (dmrs-group1 or 2) in the form of:
dmrs-group1={DMRS CDM group set in dmrs-group1},
dmrs-group2={DMRS CDM group set in dmrs-group2}.

If there is only one QCL group, the terminal can only be notified of the value of the non-empty DMRS QCL group, and the specific form is:
dmrs-group1={DMRS CDM set in dmrs-group1} (if dmrs-group1 is not empty);
or dmrs-group2={DMRS CDM set in dmrs-group2} (if dmrs-group2 is not empty).

Figure 5:
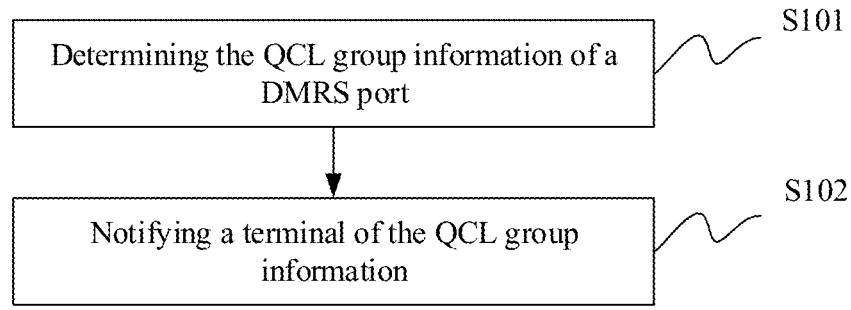
FIG. 5 is a flow schematic diagram of an information indicating method provided by an embodiment of the present application.

In summary, at the network side, referring to FIG. 5, an information indicating method provided by an embodiment of the present application includes:

S101: determining the QCL group information of a DMRS port;

S102: notifying a terminal of the QCL group information described in S101.

Here, the QCL group information is, for example, the above QCL grouping ways of the DMRS ports, or the number information of the DMRS ports contained in each QCL group, or the number information of the DMRS CDM groups contained in each QCL group.

Figure 6:
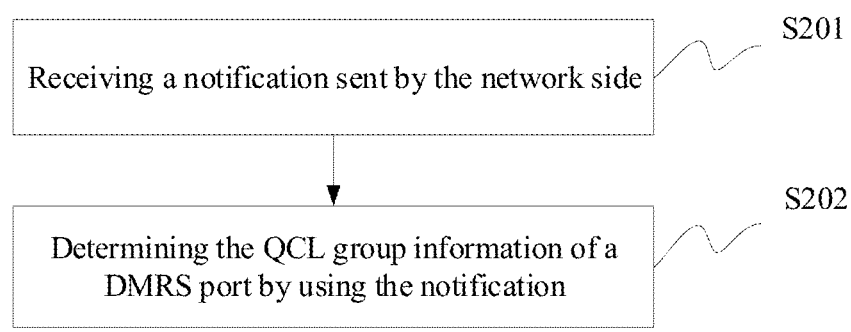
FIG. 6 is a flow schematic diagram of an information determining method provided by an embodiment of the present application.

Accordingly, at the terminal side, referring to FIG. 6, an information indicating method provided by an embodiment of the present application includes:

S201: receiving a notification sent by the network side.

Here, the notification may be a notification in the form of DCI or a notification in the form of other signaling.

S202: determining the QCL group information of a DMRS port by using the notification described in S201.

Here, the QCL group information is, for example, the above QCL grouping ways of the DMRS ports, or the number information of the DMRS ports contained in each QCL group, or the number information of the DMRS CDM groups contained in each QCL group.

Figure 7:
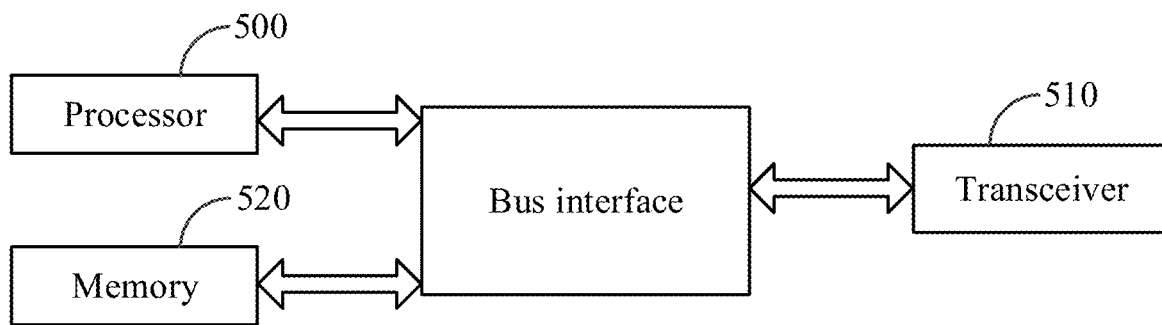
FIG. 7 is a structural schematic diagram of an information indicating apparatus provided by an embodiment of the present application.

At the network side, referring to FIG. 7, an information indicating apparatus provided by an embodiment of the present application includes: a memory 520 and a processor 500, and the memory is configured to store the program instructions, and the processor is configured to invoke the program instructions stored in the memory and, in accordance with the obtained program, perform:

determine the QCL group information of a DMRS port;
notify a terminal of the QCL group information via a transceiver 510.

Here, it should be noted that all of the bus interface, the transceiver 510 and the like in FIG. 7 may be present as optional devices in the information indicating apparatus provided by the embodiment of the present application, and are not necessary.

The transceiver 510 is configured to receive and send the data under the control of the processor 500.

In one embodiments, when determining the QCL group information of the DMRS port, the processor 500 is configured to:

determine the available DMRS port range, or determine the range of an available DMRS CDM group; and determine the QCL grouping information of an available DMRS port; and the DMRS CDM group is a CDM group of DMRS ports;
when notifying the terminal of the QCL group information, the processor 500 is configured to:
configure or notify the terminal with/of the QCL grouping information of the DMRS port.

In one embodiments, the processor 500 is configured to:
determine the available DMRS port range in one of the following ways:
way 1-a-1: determining the available DMRS port range as all DMRS ports supported under the configuration condition that satisfies the DMRS configuration type and the maximum number of DMRS symbols;
way 1-a-2: determining the available DMRS port range as all DMRS ports supported under the configuration condition that satisfies the DMRS configuration type;
way 1-a-3: determining the available DMRS port range as all DMRS ports supported under the configuration condition that satisfies the DMRS configuration type and the maximum number of DMRS symbols as well as the number of layers that can be supported by a base station and terminal;
way 1-a-4: selecting one or more DMRS ports as the available DMRS port range from the available DMRS port range determined in any above way.

In one embodiments, if the way 1-a-1 is adopted, then:
when the DMRS configuration type is a first type and the maximum number of DMRS symbols is 1, the available DMRS port range is {1000-1003};
when the DMRS configuration type is the first type and the maximum number of DMRS symbols is 2, the available DMRS port range is {1000-1007};
when the DMRS configuration type is a second type and the maximum number of DMRS symbols is 1, the available DMRS port range is {1000-1005};
when the DMRS configuration type is the second type and the maximum number of DMRS symbols is 2, the available DMRS port range is {1000-1011}.

In one embodiments, if the way 1-a-2 is adopted, then:
when the DMRS configuration type is a first type, the available DMRS port range is {1000-1007};
when the DMRS configuration type is a second type, the available DMRS port range is {1000-1011}.

In one embodiments, the processor 500 is configured to:
determine the range of the available DMRS CDM group in one of the following ways:

way 1-b-1: determining the range of the available DMRS CDM group as all DMRS CDM groups supported under the configuration condition that satisfies the DMRS configuration type;

way 1-b-2: determining the range of the available DMRS CDM group as one or more of all DMRS CDM groups supported under the configuration condition that satisfies the DMRS configuration type.

In one embodiments, if the way 1-b-1 is adopted, then:
when the DMRS configuration type is a first type, the range of the available DMRS CDM group is {0, 1};
when the DMRS configuration type is a second type, the range of the available DMRS CDM group is {0, 1, 2}.

In one embodiments, if the way 1-b-2 is adopted, then:
when the DMRS configuration type is a first type, the available DMRS CDM group is {0, 1} or {0} or {1};
when the DMRS configuration type is a second type, the available DMRS CDM group is {0, 1, 2} or {0, 1} or {1, 2} or {0, 2} or {0} or {1} or {2}.

In one embodiments, the processor 500 is configured to:
determine all possible grouping ways of DMRS QCL according to the following principles:
performing the QCL grouping by taking the determined available DMRS CDM group as a basic device;
dividing any available DMRS port or any available DMRS CDM group into the QCL grouping of DMRS ports.

In one embodiments, the processor 500 is configured to:
when the DMRS configuration type is a first type, if the available DMRS port range is {1000-1003}, then:
when there are two QCL groups:
dmrs-group1={1000, 1001}, dmrs-group2={1002, 1003}; or
dmrs-group2={1000, 1001}, dmrs-group1={1002, 1003};
when there is a QCL group:
dmrs-group1={1000, 1001, 1002, 1003}, dmrs-group2={ }; or
dmrs-group2={1000, 1001, 1002, 1003}, dmrs-group1={ };
and dmrs-group1 represents the first QCL group, dmrs-group2 represents the second QCL group, and { } represents an empty or inexistent set.

In one embodiments, the processor 500 is configured to:
when the DMRS configuration type is a first type, if the available DMRS port range is {1000-1007}, then:
when there are two QCL groups:
dmrs-group1={1000, 1001, 1004, 1005}, dmrs-group2={1002, 1003, 1006, 1007}; or
dmrs-group2={1000, 1001, 1004, 1005}, dmrs-group1={1002, 1003, 1006, 1007};
when there is a QCL group:
dmrs-group1={1000, 1001, 1002, 1003, 1004, 1005, 1006, 1007}, dmrs-group2={1}; or
dmrs-group2={1000, 1001, 1002, 1003, 1004, 1005, 1006, 1007}, dmrs-group1={1};
and dmrs-group1 represents the first QCL group, dmrs-group2 represents the second QCL group, and { } represents an empty or inexistent set.

In one embodiments, the processor 500 is configured to:
when the DMRS configuration type is a second type, if the available DMRS port range is {1000-1005}, then:
when there are two QCL groups:
dmrs-group1={1000, 1001}, dmrs-group2={1002, 1003, 1004, 1005}; or
dmrs-group2={1000, 1001}, dmrs-group1={1002, 1003, 1004, 1005}; or dmrs-group1={1000, 1001, 1002, 1003}, dmrs-group2={1004, 1005}; or
dmrs-group2={1000, 1001, 1002, 1003}, dmrs-group1={1004, 1005}; or
dmrs-group1={1002, 1003}, dmrs-group2={1000, 1001, 1004, 1005}; or
dmrs-group2={1002, 1003}, dmrs-group1={1000, 1001, 1004, 1005};
when there is a QCL group:
dmrs-group1={1000, 1001, 1002, 1003, 1004, 1005}, dmrs-group2={1}; or
dmrs-group2={1000, 1001, 1002, 1003, 1004, 1005}, dmrs-group1={1};
and dmrs-group1 represents the first QCL group, dmrs-group2 represents the second QCL group, and { } represents an empty or inexistent set.

In one embodiments, the processor 500 is configured to:
when the DMRS configuration type is a second type, if the available DMRS port range is {1000-1011}, then:
when there are two QCL groups:
dmrs-group1={1000, 1001, 1006, 1007}, dmrs-group2={1002, 1003, 1008, 1009, 1004, 1005, 1010, 1011}; or
dmrs-group2={1000, 1001, 1006, 1007}, dmrs-group1={1002, 1003, 1008, 1009, 1004, 1005, 1010, 1011}; or
dmrs-group1={1000, 1001, 1006, 1007, 1002, 1003, 1008, 1009}, dmrs-group2={1004, 1005, 1010, 1011}; or
dmrs-group2={1000, 1001, 1006, 1007, 1002, 1003, 1008, 1009}, dmrs-group1={1004, 1005, 1010, 1011}; or
dmrs-group1={1002, 1003, 1008, 1009}, dmrs-group2={1000, 1001, 1006, 1007, 1004, 1005, 1010, 1011}; or
dmrs-group2={1002, 1003, 1008, 1009}, dmrs-group1={1000, 1001, 1006, 1007, 1004, 1005, 1010, 1011};
when there is a QCL group:
dmrs-group1={1000, 1001, 1002, 1003, 1004, 1005, 1006, 1007, 1008, 1009, 1010, 1011}, dmrs-group2={ }; or
dmrs-group2={1000, 1001, 1002, 1003, 1004, 1005, 1006, 1007, 1008, 1009, 1010, 1011}, dmrs-group1={ };
and dmrs-group1 represents the first QCL group, dmrs-group2 represents the second QCL group, and { } represents an empty or inexistent set.

In one embodiments, the processor 500 is configured to:
when the DMRS configuration type is a first type, if the available DMRS CDM group is {0, 1}, then:
when there are two QCL groups:
dmrs-group1={DMRS CDM group 0}, dmrs-group2={DMRS CDM group 1};
or dmrs-group2={DMRS CDM group 0}, dmrs-group1={DMRS CDM group 1};
when there is a QCL group:
dmrs-group1={DMRS CDM group 0, DMRS CDM group 1}, dmrs-group2={ };
or dmrs-group2={DMRS CDM group 0, DMRS CDM group 1}, dmrs-group1={ };
and dmrs-group1 represents the first QCL group, dmrs-group2 represents the second QCL group, and { } represents an empty or inexistent set.

In one embodiments, the processor 500 is configured to:
when the DMRS configuration type is a second type, if the available DMRS CDM group is {0, 1, 3}, then:

when there are two QCL groups:
dmrs-group1={DMRS CDM group 0}, dmrs-group2={DMRS CDM group 1, DMRS CDM group 2}; or
dmrs-group2={DMRS CDM group 0}, dmrs-group1={DMRS CDM group 1, DMRS CDM group 2}; or
dmrs-group1={DMRS CDM group 1}, dmrs-group2={DMRS CDM group 0, DMRS CDM group 2}; or
dmrs-group2={DMRS CDM group 1}, dmrs-group1={DMRS CDM group 0, DMRS CDM group 2}; or
dmrs-group1={DMRS CDM group 2}, dmrs-group2={DMRS CDM group 0, DMRS CDM group 1}; or
dmrs-group2={DMRS CDM group 2}, dmrs-group1={DMRS CDM group 0, DMRS CDM group 1};
when there is a QCL group:
dmrs-group1={DMRS CDM group 0, DMRS CDM group 1, DMRS CDM group 2}, dmrs-group2={ }; or
dmrs-group2={DMRS CDM group 0, DMRS CDM group 1, DMRS CDM group 2}, dmrs-group1={ };
and dmrs-group1 represents the first QCL group, dmrs-group2 represents the second QCL group, and { } represents an empty or inexistent set.

In one embodiments, the processor 500 is configured to:
configure or notify DMRS ports contained in each QCL grouping of DMRS ports; and/or
configure or notify a DMRS CDM group contained in each QCL grouping of DMRS ports.

Here, in FIG. 7, the bus architecture can include any numbers of interconnected buses and bridges, and link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the devices for communicating with various other devices over the transmission media. The processor 500 is responsible for managing the bus architecture and general processing, and the memory 520 may store the data used by the processor 500 when performing the operations.

The processor 500 may be Central Processing Device (CPU), Application Specific Integrated Circuit (ASIC), Field-Programmable Gate Array (FPGA) or Complex Programmable Logic Device (CPLD).

Figure 8:
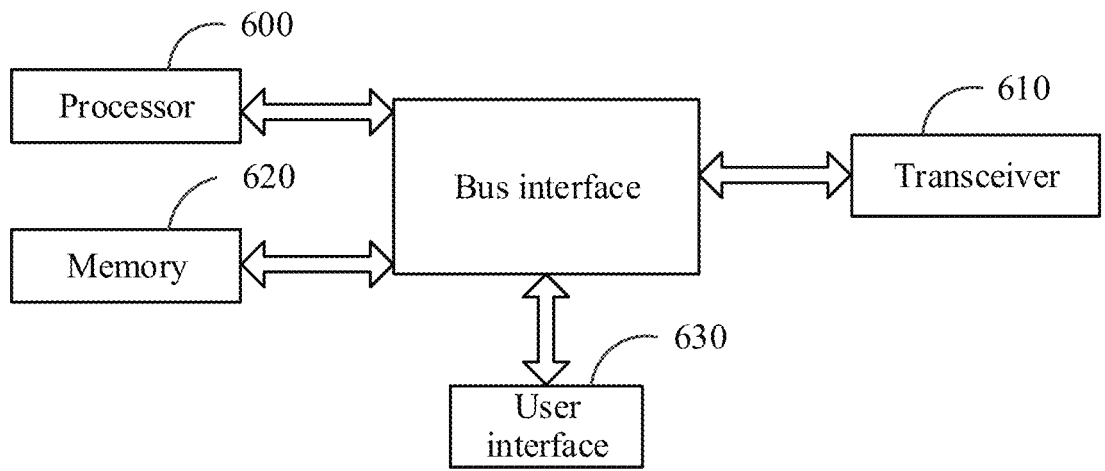
FIG. 8 is a structural schematic diagram of an information determining apparatus provided by an embodiment of the present application.

Referring to FIG. 8, at the terminal side, an information determining apparatus provided by an embodiment of the present application includes: a memory 620 and a processor 600, and the memory is configured to store the program instructions, and the processor is configured to invoke the program instructions stored in the memory and, in accordance with the obtained program, perform:
receive the QCL group information of a DMRS port notified by the network side via a transceiver 610;
determine the ordering mode of the DMRS ports occupied by the terminal according to the QCL group information of the DMRS port.

It should be noted that the devices other than the memory 620 and the processor 600 in FIG. 8 are present as optional devices in the information determining apparatus provided by the embodiment of the present application, and are not required devices.

The transceiver 610 is configured to receive and send the data under the control of the processor 600.

In one embodiments, the QCL group information of the DMRS port, includes:
DMRS ports contained in each QCL grouping of DMRS ports; and/or a DMRS CDM group contained in each QCL grouping of DMRS ports.

Here, in FIG. 8, the bus architecture may include any numbers of interconnected buses and bridges, and link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the devices for communicating with various other devices over the transmission media. For different user equipments, the user interface 630 may also be the interface for inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

In one embodiments, the processor 600 may be CPU (Central Processing Device), ASIC (Application Specific Integrated Circuit), FPGA (Field-Programmable Gate Array) or CPLD (Complex Programmable Logic Device).

Figure 9:
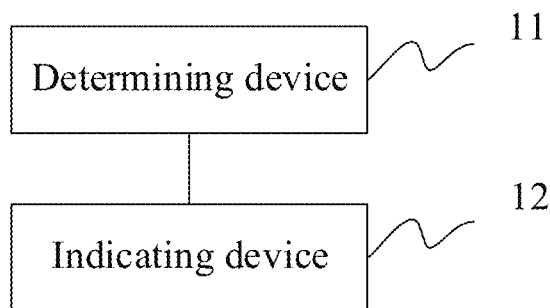
FIG. 9 is a structural schematic diagram of another information indicating apparatus provided by an embodiment of the present application.

At the network side, referring to FIG. 9, another information indicating apparatus provided by an embodiment of the present application includes:
a determining device 11 configured to determine the QCL group information of a DMRS port;
an indicating device 12 configured to notify a terminal of the QCL group information.

In one embodiments, the determining device 11 is configured to:
determine the available DMRS port range, or determine the range of an available DMRS CDM group; and determine the QCL grouping information of an available DMRS port; and the DMRS CDM group is a CDM group of DMRS ports;

The indicating device 12 is configured to:
configure or notify the terminal with/of the QCL grouping information of the DMRS port.

In one embodiments, the determining device 11 is configured to:
determine the available DMRS port range in one of the following ways:
way 1-a-1: determining the available DMRS port range as all DMRS ports supported under the configuration condition that satisfies the DMRS configuration type and the maximum number of DMRS symbols;
way 1-a-2: determining the available DMRS port range as all DMRS ports supported under the configuration condition that satisfies the DMRS configuration type;
way 1-a-3: determining the available DMRS port range as all DMRS ports supported under the configuration condition that satisfies the DMRS configuration type and the maximum number of DMRS symbols as well as the number of layers that can be supported by a base station and terminal;

way 1-a-4: selecting one or more DMRS ports as the available DMRS port range from the available DMRS port range determined in any above way.

In one embodiments, if the way 1-a-1 is adopted, then:
when the DMRS configuration type is a first type and the maximum number of DMRS symbols is 1, the available DMRS port range is {1000-1003};
when the DMRS configuration type is the first type and the maximum number of DMRS symbols is 2, the available DMRS port range is {1000-1007};
when the DMRS configuration type is a second type and the maximum number of DMRS symbols is 1, the available DMRS port range is {1000-1005};
when the DMRS configuration type is the second type and the maximum number of DMRS symbols is 2, the available DMRS port range is {1000-1011}.

In one embodiments, if the way 1-a-2 is adopted, then:
when the DMRS configuration type is a first type, the available DMRS port range is {1000-1007};
when the DMRS configuration type is a second type, the available DMRS port range is {1000-1011}.

In one embodiments, the determining device 11 is configured to:
determine the range of the available DMRS CDM group in one of the following ways:
way 1-b-1: determining the range of the available DMRS CDM group as all DMRS CDM groups supported under the configuration condition that satisfies the DMRS configuration type;
way 1-b-2: determining the range of the available DMRS CDM group as one or more of all DMRS CDM groups supported under the configuration condition that satisfies the DMRS configuration type.

In one embodiments, if the way 1-b-1 is adopted, then:
when the DMRS configuration type is a first type, the range of the available DMRS CDM group is {0, 1};
when the DMRS configuration type is a second type, the range of the available DMRS CDM group is {0, 1, 2}.

In one embodiments, if the way 1-b-2 is adopted, then:
when the DMRS configuration type is a first type, the available DMRS CDM group is {0, 1} or {0} or {1};
when the DMRS configuration type is a second type, the available DMRS CDM group is {0, 1, 2} or {0, 1} or {1, 2} or {0, 2} or {0} or {1} or {2}.

In one embodiments, according to the method of claim 6, if the way 1-b-2 is adopted, then:
when the DMRS configuration type is a first type, the available DMRS CDM group is {0, 1} or {0} or {1};
when the DMRS configuration type is a second type, the available DMRS CDM group is {0, 1, 2} or {0, 1} or {1, 2} or {0, 2} or {0} or {1} or {2}.

In one embodiments, the determining device 11 is configured to:
determine all possible grouping ways of DMRS QCL according to the following principles:
performing the QCL grouping by taking the determined available DMRS CDM group as a basic device;
dividing any available DMRS port or any available DMRS CDM group into the QCL grouping of DMRS ports.

In one embodiments, the determining device 11 is configured to:
when the DMRS configuration type is a first type, if the available DMRS port range is {1000-1003}, then:
when there are two QCL groups:
dmrs-group1={1000, 1001}, dmrs-group2={1002, 1003}; or
dmrs-group2={1000, 1001}, dmrs-group1={1002, 1003};
when there is a QCL group:
dmrs-group1={1000, 1001, 1002, 1003}, dmrs-group2={ }; or
dmrs-group2={1000, 1001, 1002, 1003}, dmrs-group1={ };
and dmrs-group1 represents the first QCL group, dmrs-group2 represents the second QCL group, and { } represents an empty or inexistent set.

In one embodiments, the determining device 11 is configured to:
when the DMRS configuration type is a first type, if the available DMRS port range is {1000-1007}, then:
when there are two QCL groups:
dmrs-group1={1000, 1001, 1004, 1005}, dmrs-group2={1002, 1003, 1006, 1007}; or
dmrs-group2={1000, 1001, 1004, 1005}, dmrs-group1={1002, 1003, 1006, 1007};
when there is a QCL group:
dmrs-group1={1000, 1001, 1002, 1003, 1004, 1005, 1006, 1007}, dmrs-group2={ }; or
dmrs-group2={1000, 1001, 1002, 1003, 1004, 1005, 1006, 1007}, dmrs-group1={ };
and dmrs-group1 represents the first QCL group, dmrs-group2 represents the second QCL group, and { } represents an empty or inexistent set.

In one embodiments, the determining device 11 is configured to:
when the DMRS configuration type is a second type, if the available DMRS port range is {1000-1005}, then:
when there are two QCL groups:
dmrs-group1={1000, 1001}, dmrs-group2={1002, 1003, 1004, 1005}; or
dmrs-group2={1000, 1001}, dmrs-group1={1002, 1003, 1004, 1005}; or
dmrs-group1={1000, 1001, 1002, 1003}, dmrs-group2={1004, 1005}; or
dmrs-group2={1000, 1001, 1002, 1003}, dmrs-group1={1004, 1005}; or
dmrs-group1={1002, 1003}, dmrs-group2={1000, 1001, 1004, 1005}; or
dmrs-group2={1002, 1003}, dmrs-group1={1000, 1001, 1004, 1005};
when there is a QCL group:
dmrs-group1={1000, 1001, 1002, 1003, 1004, 1005}, dmrs-group2={ }; or
dmrs-group2={1000, 1001, 1002, 1003, 1004, 1005}, dmrs-group1={ };
and dmrs-group1 represents the first QCL group, dmrs-group2 represents the second QCL group, and { } represents an empty or inexistent set.

In one embodiments, the determining device 11 is configured to:
when the DMRS configuration type is a second type, if the available DMRS port range is {1000-1011}, then:
when there are two QCL groups:
dmrs-group1={1000, 1001, 1006, 1007}, dmrs-group2={1002, 1003, 1008, 1009, 1004, 1005, 1010, 1011}; or
dmrs-group2={1000, 1001, 1006, 1007}, dmrs-group1={1002, 1003, 1008, 1009, 1004, 1005, 1010, 1011}; or dmrs-group1={1000, 1001, 1006, 1007, 1002, 1003, 1008, 1009}, dmrs-group2={1004, 1005, 1010, 1011}; or dmrs-group2={1000, 1001, 1006, 1007, 1002, 1003, 1008, 1009}, dmrs-group1={1004, 1005, 1010, 1011}; or dmrs-group1={1002, 1003, 1008, 1009}, dmrs-group2={1000, 1001, 1006, 1007, 1004, 1005, 1010, 1011}; or dmrs-group2={1002, 1003, 1008, 1009}, dmrs-group1={1000, 1001, 1006, 1007, 1004, 1005, 1010, 1011};

when there is a QCL group:

dmrs-group1={1000, 1001, 1002, 1003, 1004, 1005, 1006, 1007, 1008, 1009, 1010, 1011}, dmrs-group2={ }; or dmrs-group2={1000, 1001, 1002, 1003, 1004, 1005, 1006, 1007, 1008, 1009, 1010, 1011}, dmrs-group1={ };

and dmrs-group1 represents the first QCL group, dmrs-group2 represents the second QCL group, and { } represents an empty or inexistent set.

In one embodiments, the determining device 11 is configured to:

when the DMRS configuration type is a first type, if the available DMRS CDM group is {0, 1}, then:

when there are two QCL groups:

dmrs-group1={DMRS CDM group 0}, dmrs-group2={DMRS CDM group 1}; or dmrs-group2={DMRS CDM group 0}, dmrs-group1={DMRS CDM group 1};

when there is a QCL group:

dmrs-group1={DMRS CDM group 0, DMRS CDM group 1}, dmrs-group2={ }; or dmrs-group2={DMRS CDM group 0, DMRS CDM group 1}, dmrs-group1={ };

and dmrs-group1 represents the first QCL group, dmrs-group2 represents the second QCL group, and { } represents an empty or inexistent set.

In one embodiments, the determining device 11 is configured to:

when the DMRS configuration type is a second type, if the available DMRS CDM group is {0, 1, 3}, then:

when there are two QCL groups:

dmrs-group1={DMRS CDM group 0}, dmrs-group2={DMRS CDM group 1, DMRS CDM group 2}; or dmrs-group2={DMRS CDM group 0}, dmrs-group1={DMRS CDM group 1, DMRS CDM group 2}; or dmrs-group1={DMRS CDM group 1}, dmrs-group2={DMRS CDM group 0, DMRS CDM group 2}; or dmrs-group2={DMRS CDM group 1}, dmrs-group1={DMRS CDM group 0, DMRS CDM group 2}; or dmrs-group1={DMRS CDM group 2}, dmrs-group2={DMRS CDM group 0, DMRS CDM group 1}; or dmrs-group2={DMRS CDM group 2}, dmrs-group1={DMRS CDM group 0, DMRS CDM group 1};

when there is a QCL group:

dmrs-group1={DMRS CDM group 0, DMRS CDM group 1, DMRS CDM group 2}, dmrs-group2={ }; or dmrs-group2={DMRS CDM group 0, DMRS CDM group 1, DMRS CDM group 2}, dmrs-group1={ };

and dmrs-group1 represents the first QCL group, dmrs-group2 represents the second QCL group, and { } represents an empty or inexistent set.

In one embodiments, the indicating device 12 is configured to:

configure or notify DMRS ports contained in each QCL grouping of DMRS ports; and/or configure or notify a DMRS CDM group contained in each QCL grouping of DMRS ports.

Figure 10:
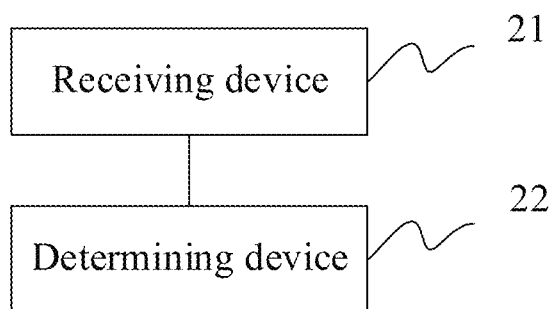
FIG. 10 is a structural schematic diagram of another information determining apparatus provided by an embodiment of the present application.

At the terminal side, referring to FIG. 10, another information determining apparatus provided by an embodiment of the present application includes:

a receiving device 21 configured to receive the QCL group information of a DMRS port notified by the network side;

a determining device 22 configured to determine the ordering mode of the DMRS ports occupied by the terminal according to the QCL group information of the DMRS port.

In one embodiments, the QCL group information of the DMRS port, includes:

DMRS ports contained in each QCL grouping of DMRS ports; and/or a DMRS CDM group contained in each QCL grouping of DMRS ports.

An embodiment of the present application provides a computer storage medium which is configured to store the computer program instructions used by the above-mentioned computing device, where the computer program instructions contain the program for performing the information indicating or determining method described above.

The computer storage medium can be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application can be applied to the terminal devices, and can also be applied to the network devices.

Here, the terminal device can also referred to as the User Equipment ("UE" for short), Mobile Station ("MS" for short), Mobile Terminal ("MT" for short) or the like. In one embodiments, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device can be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station may be the Base Transceiver Station (BTS) in the GSM or CDMA, or may be the NodeB in the WCDMA, or may be the evolutional Node B (NodeB or eNB or e-NodeB) in the LTE, which is not limited in the embodiments of the disclosure. The embodiments of the present application can provide methods, systems and computer program products.

Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is for guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. An information indicating method, comprising:
  determining Quasi-Co-Location, QCL, group information of a Demodulation Reference Signal, DMRS, port, by determining a range of an available DMRS Code Division Multiplexing, CDM, group, and determining QCL grouping information of an available DMRS port; wherein the DMRS CDM group is a CDM group of DMRS ports;
  notifying a terminal of the QCL group information, by configuring the terminal with the QCL grouping information of the DMRS port or notifying the terminal of the QCL grouping information of the DMRS port;
  wherein the determining a range of an available DMRS CDM group, comprises one of the following:
  determining the range of the available DMRS CDM group as all DMRS CDM groups supported under a configuration condition that satisfies a DMRS configuration type; or
  determining the range of the available DMRS CDM group as one or more of all DMRS CDM groups supported under a configuration condition that satisfies a DMRS configuration type.

2. The method according to claim 1, wherein if determining the range of the available DMRS CDM group as all DMRS CDM groups supported under a configuration condition that satisfies a DMRS configuration type, then:
  when the DMRS configuration type is a first type, the range of the available DMRS CDM group is {0, 1};
  when the DMRS configuration type is a second type, the range of the available DMRS CDM group is {0, 1, 2};
  wherein if determining the range of the available DMRS CDM group as one or more of all DMRS CDM groups supported under a configuration condition that satisfies a DMRS configuration type, then:
  when the DMRS configuration type is a first type, the available DMRS CDM group is {0, 1} or {0} or {1};
  when the DMRS configuration type is a second type, the available DMRS CDM group is {0, 1, 2} or {0, 1} or {1, 2} or {0, 2} or {0} or {1} or {2}.

3. The method according to claim 1, wherein the determining QCL grouping information of an available DMRS port, comprises:
  determining all possible grouping ways of DMRS QCL according to following principles:
  performing QCL grouping by taking the determined available DMRS CDM group as a basic unit;
  dividing any available DMRS port or any available DMRS CDM group into the QCL grouping of DMRS ports.

4. The method according to claim 1, wherein determining QCL grouping information of an available DMRS port when performing QCL grouping on the available DMRS port, comprises:
  when the DMRS configuration type is a first type, if the available DMRS port range is {1000-1003}, then:
  when there are two QCL groups:
  dmrs-group1={1000, 1001}, dmrs-group2={1002, 1003}; or
  dmrs-group2={1000, 1001}, dmrs-group1={1002, 1003};
  when there is a QCL group:
  dmrs-group1={1000, 1001, 1002, 1003}, dmrs-group2={ }; or
  dmrs-group2={1000, 1001, 1002, 1003}, dmrs-group1={ };
  wherein dmrs-group1 represents a first QCL group, dmrs-group2 represents a second QCL group, and { } represents an empty or inexistent set;
  wherein determining QCL grouping information of an available DMRS port when performing QCL grouping on the available DMRS port, comprises:
  when the DMRS configuration type is a first type, if the available DMRS port range is {1000-1007}, then:
  when there are two QCL groups:
  dmrs-group1={1000, 1001, 1004, 1005}, dmrs-group2={1002, 1003, 1006, 1007}; or
  dmrs-group2={1000, 1001, 1004, 1005}, dmrs-group1={1002, 1003, 1006, 1007};
  when there is a QCL group:
  dmrs-group1={1000, 1001, 1002, 1003, 1004, 1005, 1006, 1007}, dmrs-group2={ }; or
  dmrs-group2={1000, 1001, 1002, 1003, 1004, 1005, 1006, 1007}, dmrs-group1={ };
  wherein dmrs-group1 represents a first QCL group, dmrs-group2 represents a second QCL group, and { } represents an empty or inexistent set;
  or
  wherein determining QCL grouping information of an available DMRS port when performing QCL grouping on the available DMRS port, comprises:

when the DMRS configuration type is a second type, if the available DMRS port range is {1000-1005}, then:
when there are two QCL groups:
dmrs-group1={1000, 1001}, dmrs-group2={1002, 1003, 1004, 1005}; or
dmrs-group2={1000, 1001}, dmrs-group1={1002, 1003, 1004, 1005}; or
dmrs-group1={1000, 1001, 1002, 1003}, dmrs-group2={1004, 1005}; or
dmrs-group2={1000, 1001, 1002, 1003}, dmrs-group1={1004, 1005}; or
dmrs-group1={1002, 1003}, dmrs-group2={1000, 1001, 1004, 1005}; or
dmrs-group2={1002, 1003}, dmrs-group1={1000, 1001, 1004, 1005};
when there is a QCL group:
dmrs-group1={1000, 1001, 1002, 1003, 1004, 1005}, dmrs-group2={ }; or
dmrs-group2={1000, 1001, 1002, 1003, 1004, 1005}, dmrs-group1={ };
wherein dmrs-group1 represents a first QCL group, dmrs-group2 represents a second QCL group, and { } represents an empty or inexistent set;
or
wherein determining QCL grouping information of an available DMRS port when performing QCL grouping on the available DMRS port, comprises:
when the DMRS configuration type is a second type, if the available DMRS port range is {1000-1011}, then:
when there are two QCL groups:
dmrs-group1={1000, 1001, 1006, 1007}, dmrs-group2={1002, 1003, 1008, 1009, 1004, 1005, 1010, 1011}; or
dmrs-group2={1000, 1001, 1006, 1007}, dmrs-group1={1002, 1003, 1008, 1009, 1004, 1005, 1010, 1011}; or
dmrs-group1={1000, 1001, 1006, 1007, 1002, 1003, 1008, 1009}, dmrs-group2={1004, 1005, 1010, 1011}; or
dmrs-group2={1000, 1001, 1006, 1007, 1002, 1003, 1008, 1009}, dmrs-group1={1004, 1005, 1010, 1011}; or
dmrs-group1={1002, 1003, 1008, 1009}, dmrs-group2={1000, 1001, 1006, 1007, 1004, 1005, 1010, 1011}; or
dmrs-group2={1002, 1003, 1008, 1009}, dmrs-group1={1000, 1001, 1006, 1007, 1004, 1005, 1010, 1011};
when there is a QCL group:
dmrs-group1={1000, 1001, 1002, 1003, 1004, 1005, 1006, 1007, 1008, 1009, 1010, 1011}, dmrs-group2={ }; or
dmrs-group2={1000, 1001, 1002, 1003, 1004, 1005, 1006, 1007, 1008, 1009, 1010, 1011}, dmrs-group1={ };
wherein dmrs-group1 represents a first QCL group, dmrs-group2 represents a second QCL group, and { } represents an empty or inexistent set.

5. The method according to claim 1, wherein determining QCL grouping information of an available DMRS port when performing QCL grouping on the available DMRS CDM group, comprises:
when the DMRS configuration type is a first type, if the available DMRS CDM group is {0, 1}, then:
when there are two QCL groups:
dmrs-group1={DMRS CDM group 0}, dmrs-group2={DMRS CDM group 1}; or
dmrs-group2={DMRS CDM group 0}, dmrs-group1={DMRS CDM group 1};
when there is a QCL group:
dmrs-group1={DMRS CDM group 0, DMRS CDM group 1}, dmrs-group2={ }; or
dmrs-group2={DMRS CDM group 0, DMRS CDM group 1}, dmrs-group1={ };
wherein dmrs-group1 represents a first QCL group, dmrs-group2 represents a second QCL group, and { } represents an empty or inexistent set;
or
wherein determining QCL grouping information of an available DMRS port when performing QCL grouping on the available DMRS CDM group, comprises:
when the DMRS configuration type is a second type, if the available DMRS CDM group is {0, 1, 3}, then:
when there are two QCL groups:
dmrs-group1={DMRS CDM group 0}, dmrs-group2={DMRS CDM group 1, DMRS CDM group 2}; or
dmrs-group2={DMRS CDM group 0}, dmrs-group1={DMRS CDM group 1, DMRS CDM group 2}; or
dmrs-group1={DMRS CDM group 1}, dmrs-group2={DMRS CDM group 0, DMRS CDM group 2}; or
dmrs-group2={DMRS CDM group 1}, dmrs-group1={DMRS CDM group 0, DMRS CDM group 2}; or
dmrs-group1={DMRS CDM group 2}, dmrs-group2={DMRS CDM group 0, DMRS CDM group 1}; or
dmrs-group2={DMRS CDM group 2}, dmrs-group1={DMRS CDM group 0, DMRS CDM group 1};
when there is a QCL group:
dmrs-group1={DMRS CDM group 0, DMRS CDM group 1, DMRS CDM group 2}, dmrs-group2={ }; or
dmrs-group2={DMRS CDM group 0, DMRS CDM group 1, DMRS CDM group 2}, dmrs-group 1={ };
wherein dmrs-group1 represents a first QCL group, dmrs-group2 represents a second QCL group, and { } represents an empty or inexistent set.

6. An information determining method, comprising:
receiving a notification sent by a network side;
determining Quasi-Co-Location, QCL, group information of a Demodulation Reference Signal, DMRS, port by using the notification;
wherein the QCL group information is determined by the network side by following schemes: determining a range of an available DMRS Code Division Multiplexing, CDM, group, and determining QCL grouping information of an available DMRS port; wherein the DMRS CDM group is a CDM group of DMRS ports;
the QCL group information is notified to a terminal by a following scheme: configuring the terminal with the QCL grouping information of the DMRS port or notifying the terminal of the QCL grouping information of the DMRS port;
wherein the determining a range of an available DMRS CDM group, comprises one of the following:
determining the range of the available DMRS CDM group as all DMRS CDM groups supported under a configuration condition that satisfies a DMRS configuration type; or determining the range of the available DMRS CDM group as one or more of all DMRS CDM groups supported under a configuration condition that satisfies a DMRS configuration type.

7. An information determining apparatus, comprising a memory and a processor, wherein the memory is configured to store program instructions, and the processor is configured to invoke the program instructions stored in the memory to implement the method according to claim 6.

8. An information indicating apparatus, comprising a memory and a processor, wherein the memory is configured to store program instructions, and the processor is configured to invoke the program instructions stored in the memory to:
  determine QCL group information of a Demodulation Reference Signal, DMRS, port, by determining a range of an available DMRS Code Division Multiplexing, CDM, group, and determining QCL grouping information of an available DMRS port; wherein the DMRS CDM group is a CDM group of DMRS ports;
  notify a terminal of the QCL group information, by configuring the terminal with the QCL grouping information of the DMRS port or notifying the terminal of the QCL grouping information of the DMRS port;
  wherein the determining a range of an available DMRS CDM group, comprises one of the following:
  determining the range of the available DMRS CDM group as all DMRS CDM groups supported under a configuration condition that satisfies a DMRS configuration type; or
  determining the range of the available DMRS CDM group as one or more of all DMRS CDM groups supported under a configuration condition that satisfies a DMRS configuration type.

9. The apparatus according to claim 8, wherein if determining the range of the available DMRS CDM group as all DMRS CDM groups supported under a configuration condition that satisfies a DMRS configuration type is adopted, then:
  when the DMRS configuration type is a first type, the range of the available DMRS CDM group is {0, 1};
  when the DMRS configuration type is a second type, the range of the available DMRS CDM group is {0, 1, 2};
  wherein if determining the range of the available DMRS CDM group as one or more of all DMRS CDM groups supported under a configuration condition that satisfies a DMRS configuration type, then:
  when the DMRS configuration type is a first type, the available DMRS CDM group is {0, 1} or {0} or {1};
  when the DMRS configuration type is a second type, the available DMRS CDM group is {0, 1, 2} or {0, 1} or {1, 2} or {0, 2} or {0} or {1} or {2}.

10. The apparatus according to claim 8, wherein, the processor is configured to invoke the program instructions stored in the memory to:
  determine all possible grouping ways of DMRS QCL according to following principles:
  performing QCL grouping by taking the determined available DMRS CDM group as a basic unit;
  dividing any available DMRS port or any available DMRS CDM group into the QCL grouping of DMRS ports.

11. The apparatus according to claim 8, wherein the processor is configured to invoke the program instructions stored in the memory to determine:
  when the DMRS configuration type is a first type, if the available DMRS port range is {1000-1003}, then:
  when there are two QCL groups:
  dmrs-group1={1000, 1001}, dmrs-group2={1002, 1003}; or
  dmrs-group2={1000, 1001}, dmrs-group1={1002, 1003};
  when there is a QCL group:
  dmrs-group1={1000, 1001, 1002, 1003}, dmrs-group2={ }; or
  dmrs-group2={1000, 1001, 1002, 1003}, dmrs-group1={ };
  wherein dmrs-group1 represents a first QCL group, dmrs-group2 represents a second QCL group, and { } represents an empty or inexistent set;
  wherein the processor is configured to invoke the program instructions stored in the memory to determine:
  when the DMRS configuration type is a first type, if the available DMRS port range is {1000-1007}, then:
  when there are two QCL groups:
  dmrs-group1={1000, 1001, 1004, 1005}, dmrs-group2={1002, 1003, 1006, 1007}; or
  dmrs-group2={1000, 1001, 1004, 1005}, dmrs-group1={1002, 1003, 1006, 1007};
  when there is a QCL group:
  dmrs-group1={1000, 1001, 1002, 1003, 1004, 1005, 1006, 1007}, dmrs-group2={ }; or
  dmrs-group2={1000, 1001, 1002, 1003, 1004, 1005, 1006, 1007}, dmrs-group1={ };
  wherein dmrs-group1 represents a first QCL group, dmrs-group2 represents a second QCL group, and { } represents an empty or inexistent set;
  or
  wherein the processor is configured to invoke the program instructions stored in the memory to determine:
  when the DMRS configuration type is a second type, if the available DMRS port range is {1000-1005}, then:
  when there are two QCL groups:
  dmrs-group1={1000, 1001}, dmrs-group2={1002, 1003, 1004, 1005}; or
  dmrs-group2={1000, 1001}, dmrs-group1={1002, 1003, 1004, 1005}; or
  dmrs-group1={1000, 1001, 1002, 1003}, dmrs-group2={1004, 1005}; or
  dmrs-group2={1000, 1001, 1002, 1003}, dmrs-group1={1004, 1005}; or
  dmrs-group1={1002, 1003}, dmrs-group2={1000, 1001, 1004, 1005}; or
  dmrs-group2={1002, 1003}, dmrs-group1={1000, 1001, 1004, 1005};
  when there is a QCL group:
  dmrs-group1={1000, 1001, 1002, 1003, 1004, 1005}, dmrs-group2={ }; or
  dmrs-group2={1000, 1001, 1002, 1003, 1004, 1005}, dmrs-group1={ };
  wherein dmrs-group1 represents a first QCL group, dmrs-group2 represents a second QCL group, and { } represents an empty or inexistent set;
  or
  wherein the processor is configured to invoke the program instructions stored in the memory to determine:
  when the DMRS configuration type is a second type, if the available DMRS port range is {1000-1011}, then:
  when there are two QCL groups:
  dmrs-group1={1000, 1001, 1006, 1007}, dmrs-group2={1002, 1003, 1008, 1009, 1004, 1005, 1010, 1011}; or dmrs-group2={1000, 1001, 1006, 1007}, dmrs-group1={1002, 1003, 1008, 1009, 1004, 1005, 1010, 1011}; or dmrs-group1={1000, 1001, 1006, 1007, 1002, 1003, 1008, 1009}, dmrs-group2={1004, 1005, 1010, 1011}; or dmrs-group2={1000, 1001, 1006, 1007, 1002, 1003, 1008, 1009}, dmrs-group1={1004, 1005, 1010, 1011}; or dmrs-group1={1002, 1003, 1008, 1009}, dmrs-group2={1000, 1001, 1006, 1007, 1004, 1005, 1010, 1011}; or dmrs-group2={1002, 1003, 1008, 1009}, dmrs-group1={1000, 1001, 1006, 1007, 1004, 1005, 1010, 1011};

when there is a QCL group:

dmrs-group1={1000, 1001, 1002, 1003, 1004, 1005, 1006, 1007, 1008, 1009, 1010, 1011}, dmrs-group2={ }; or dmrs-group2={1000, 1001, 1002, 1003, 1004, 1005, 1006, 1007, 1008, 1009, 1010, 1011}, dmrs-group1={ };

wherein dmrs-group1 represents a first QCL group, dmrs-group2 represents a second QCL group, and { } represents an empty or inexistent set.

12. The apparatus according to claim 8, wherein the processor is configured to invoke the program instructions stored in the memory to determine:

when the DMRS configuration type is a first type, if the available DMRS CDM group is {0, 1}, then:

when there are two QCL groups:

dmrs-group1={DMRS CDM group 0}, dmrs-group2={DMRS CDM group 1};

or dmrs-group2={DMRS CDM group 0}, dmrs-group1={DMRS CDM group 1};

when there is a QCL group:

dmrs-group1={DMRS CDM group 0, DMRS CDM group 1}, dmrs-group2={ };

or dmrs-group2={DMRS CDM group 0, DMRS CDM group 1}, dmrs-group1={ };

wherein dmrs-group1 represents a first QCL group, dmrs-group2 represents a second QCL group, and { } represents an empty or inexistent set;

or wherein the processor is configured to invoke the program instructions stored in the memory to determine:

when the DMRS configuration type is a second type, if the available DMRS CDM group is {0, 1, 3}, then:

when there are two QCL groups:

dmrs-group1={DMRS CDM group 0}, dmrs-group2={DMRS CDM group 1, DMRS CDM group 2}; or dmrs-group2={DMRS CDM group 0}, dmrs-group1={DMRS CDM group 1, DMRS CDM group 2}; or dmrs-group1={DMRS CDM group 1}, dmrs-group2={DMRS CDM group 0, DMRS CDM group 2}; or dmrs-group2={DMRS CDM group 1}, dmrs-group1={DMRS CDM group 0, DMRS CDM group 2}; or dmrs-group1={DMRS CDM group 2}, dmrs-group2={DMRS CDM group 0, DMRS CDM group 1}; or dmrs-group2={DMRS CDM group 2}, dmrs-group1={DMRS CDM group 0, DMRS CDM group 1};

when there is a QCL group:

dmrs-group1={DMRS CDM group 0, DMRS CDM group 1, DMRS CDM group 2}, dmrs-group2={ }; or dmrs-group2={DMRS CDM group 0, DMRS CDM group 1, DMRS CDM group 2}, dmrs-group 1={ };

wherein dmrs-group1 represents a first QCL group, dmrs-group2 represents a second QCL group, and { } represents an empty or inexistent set.

* * * * *